(12) United States Patent
Adomaitis et al.

(10) Patent No.: US 10,308,433 B2
(45) Date of Patent: Jun. 4, 2019

(54) CONVEYOR BELT SLAT WITH SIDE CARRIER CONNECTION

(71) Applicant: PRINCE CASTLE LLC, Carol Stream, IL (US)

(72) Inventors: Matthew Adomaitis, Aurora, IL (US); Frank Anthony Agnello, Huntley, IL (US); Richard Bauer, Palatine, IL (US); Eloy Cerda, Westchester, IL (US); Mark Edward Fastabend, Chicago, IL (US); Sean Patrick Forrest, Park Ridge, IL (US); Charles B. Hartfelder, Hanover Park, IL (US); Karl R. Heinze, Chicago, IL (US); Scott R. Hammac, Joliet, IL (US); Kyle Thomas Kestner, Schaumburg, IL (US); Christine Suen Laub, Roselle, IL (US); Eugene Stanley Maslana, Morton Grove, IL (US); Calvin States Nelson, Round Lake Beach, IL (US); Laurence A. Schoell, Shorewood, IL (US); Zoran Ulicevic, Wheaton, IL (US); Aleksandr Yazvin, Glenview, IL (US); Loren J. Veltrop, Chicago, IL (US); Brian J. Truesdale, Carol Stream, IL (US); Dennis Malkowski, Yorkville, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 0 days.

(21) Appl. No.: 15/635,541

(22) Filed: Jun. 28, 2017

(65) Prior Publication Data
US 2018/0002110 A1 Jan. 4, 2018

Related U.S. Application Data

(60) Provisional application No. 62/356,514, filed on Jun. 29, 2016.

(51) Int. Cl.
*A47J 37/04* (2006.01)
*B65G 17/06* (2006.01)

(52) U.S. Cl.
CPC .......... *B65G 17/067* (2013.01); *A47J 37/045* (2013.01); *B65G 17/063* (2013.01); *B65G 2201/0202* (2013.01)

(58) Field of Classification Search
CPC .............. B65G 17/067; B65G 17/063; B65G 2201/0202; B65G 17/083; A47J 37/045
USPC ......................................................... 198/848
See application file for complete search history.

(56) References Cited

U.S. PATENT DOCUMENTS 527,723 A * 10/1894 Sargent ................ B65G 17/083
                                                198/848
2,987,167 A    6/1961 Franz
3,174,618 A * 3/1965 Wesson ................ B65G 17/067
                                                198/822

(Continued)

FOREIGN PATENT DOCUMENTS

JP           H06-141985 A           5/1994

*Primary Examiner* — Mark A Deuble
(74) *Attorney, Agent, or Firm* — Marshall, Gerstein & Borun LLP

(57) ABSTRACT

A conveyor belt includes a conveyor belt slat that is coupled to a side carrier by a locking connection between the slat and the carrier at least along the side edges of the conveyor belt slat.

6 Claims, 17 Drawing Sheets

(56) References Cited

U.S. PATENT DOCUMENTS

| | | | | |
|---|---|---|---|---|
| 3,339,712 | A * | 9/1967 | Anderson | A01D 17/10 198/834 |
| 3,976,192 | A * | 8/1976 | Muller | B65G 15/52 198/803.2 |
| 4,027,792 | A * | 6/1977 | Jeter | B65G 17/067 198/618 |
| 4,281,760 | A * | 8/1981 | Muller | B65G 15/52 198/846 |
| 4,394,901 | A | 7/1983 | Roinestad | |
| 4,473,365 | A | 9/1984 | Lapeyre | |
| 4,553,663 | A * | 11/1985 | Johnson | A01D 61/02 198/465.1 |
| 5,307,923 | A | 5/1994 | Damkjaer | |
| 5,738,223 | A * | 4/1998 | Rohrs | A01D 17/10 198/848 |
| 6,223,889 | B1 | 5/2001 | Layne et al. | |
| 6,581,758 | B1 | 6/2003 | van-Zijderveld et al. | |
| 6,707,014 | B1 * | 3/2004 | Corey | A23L 3/185 198/844.1 |
| 6,918,486 | B2 | 7/2005 | Shibayama et al. | |
| 7,278,535 | B2 | 10/2007 | Damkjaer | |
| 7,314,132 | B2 | 1/2008 | Layne et al. | |
| 7,419,051 | B2 | 9/2008 | Damkjaer | |
| 7,530,455 | B2 | 5/2009 | Lucchi | |
| 7,708,135 | B2 | 5/2010 | Ellerth et al. | |
| 7,721,877 | B2 | 5/2010 | Maine, Jr. et al. | |
| 7,800,023 | B2 | 9/2010 | Burtea et al. | |
| 7,878,323 | B2 | 2/2011 | Van Rees et al. | |
| 7,975,840 | B2 | 7/2011 | Messick, Jr. et al. | |
| 7,987,972 | B2 | 8/2011 | Hennigar et al. | |
| 8,113,340 | B1 | 2/2012 | Smith et al. | |
| 8,499,928 | B1 | 8/2013 | Liao et al. | |
| 8,506,687 | B2 | 8/2013 | Jones | |
| 8,752,698 | B2 | 6/2014 | Lasecki et al. | |
| 8,863,944 | B2 | 10/2014 | MacLachlan | |
| 8,939,279 | B2 | 1/2015 | Porter et al. | |
| 9,073,694 | B2 | 7/2015 | Ozaki | |
| 9,221,611 | B2 | 12/2015 | Ulchak et al. | |
| 9,540,175 | B1 * | 1/2017 | Van Dalsem | B65G 17/32 |
| 2008/0073184 | A1 * | 3/2008 | Yoshida | B65G 17/067 198/844.1 |
| 2010/0275789 | A1 | 11/2010 | Lee et al. | |
| 2013/0048473 | A1 * | 2/2013 | Gough | B65G 17/067 198/836.1 |
| 2015/0129395 | A1 | 5/2015 | Messick, Jr. | |
| 2015/0151919 | A1 | 6/2015 | Messick, Jr. et al. | |
| 2015/0191312 | A1 | 7/2015 | Ulchak et al. | |
| 2016/0185529 | A1 | 6/2016 | Bauer | |
| 2016/0185530 | A1 | 6/2016 | Malkowski et al. | |
| 2016/0368711 | A1 * | 12/2016 | Ulchak | B65G 17/083 |
| 2017/0210567 | A1 * | 7/2017 | Malkowski | B65G 17/34 |

* cited by examiner

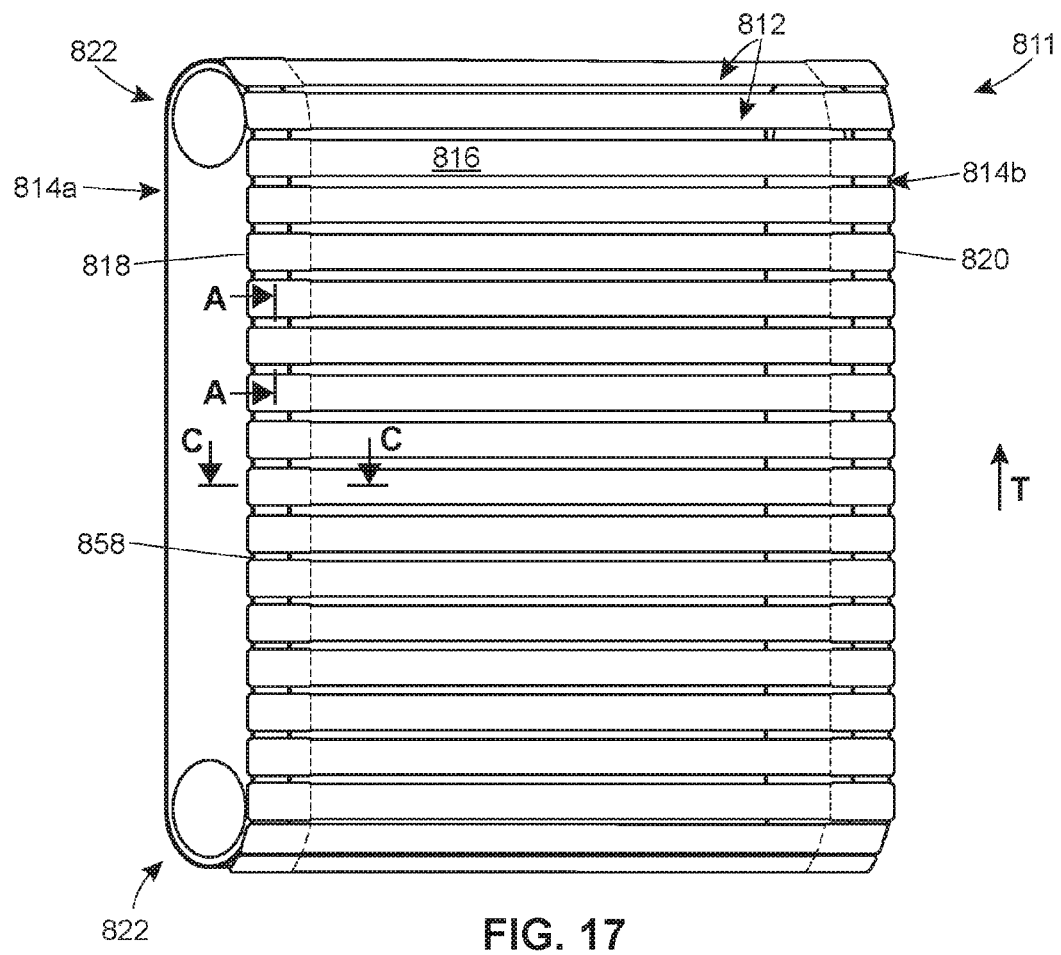
FIG. 17
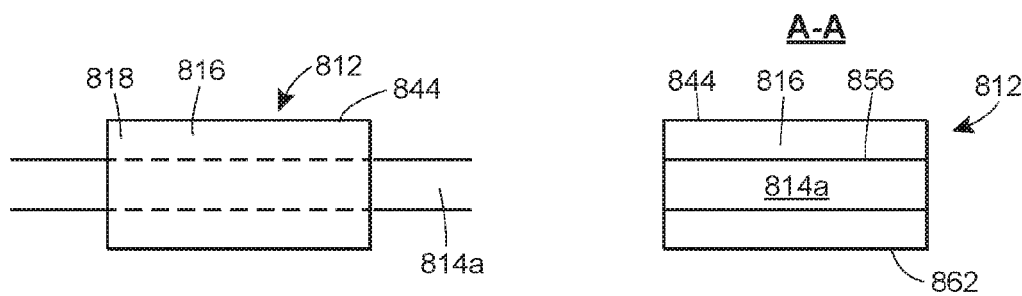
FIG. 18A
FIG. 18B
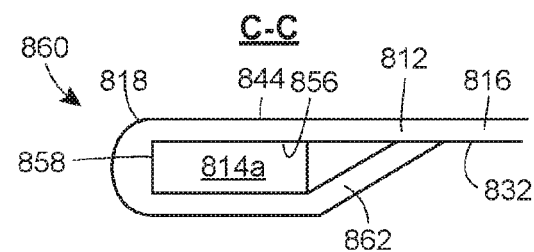
FIG. 18C

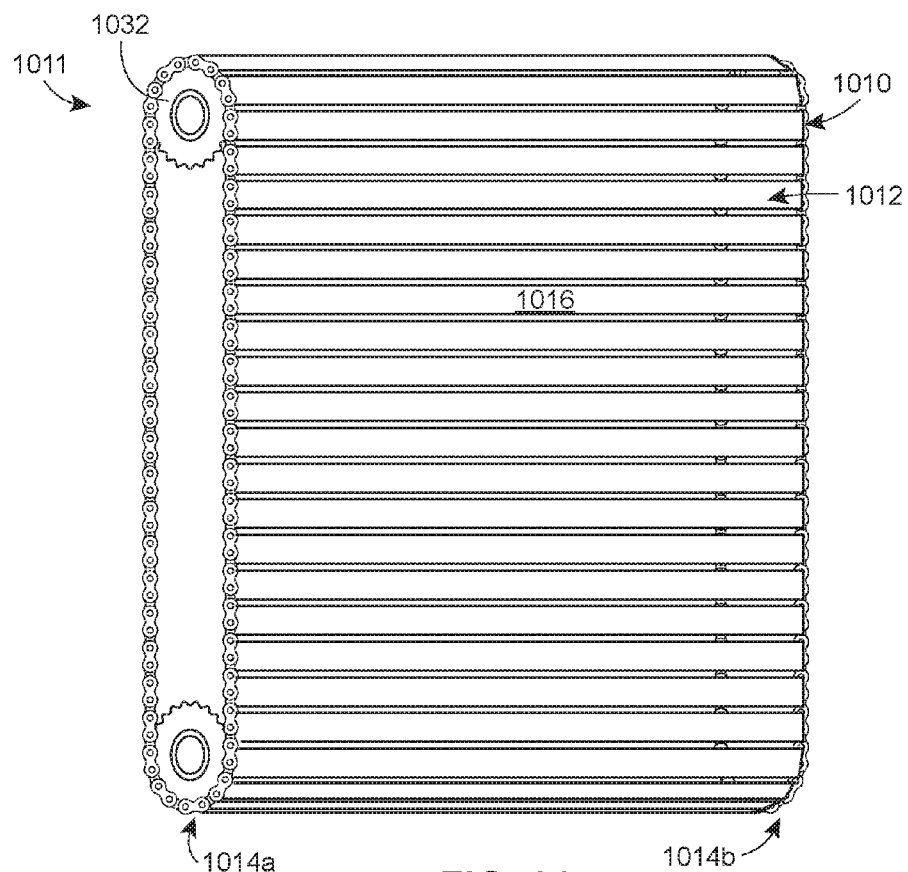
FIG. 21
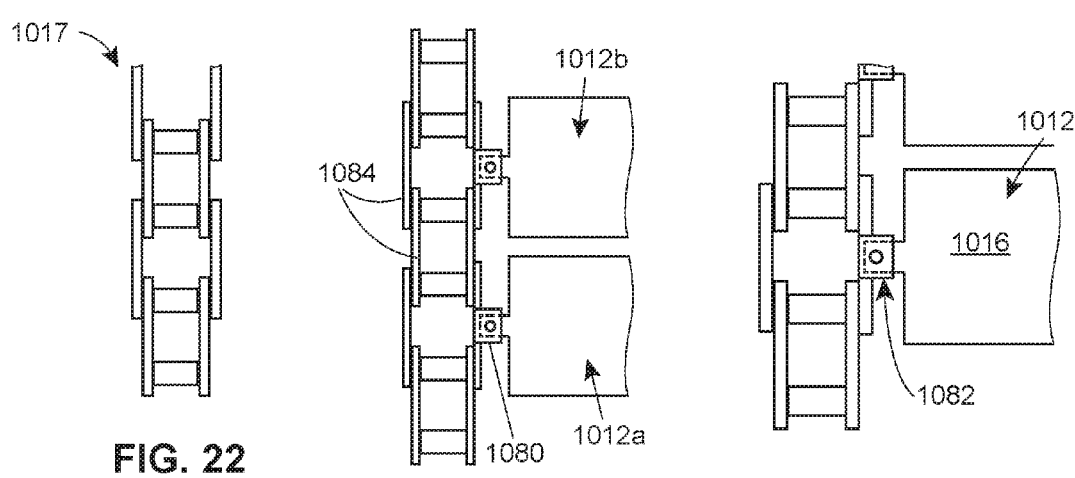
FIG. 22
FIG. 23A
FIG. 23B

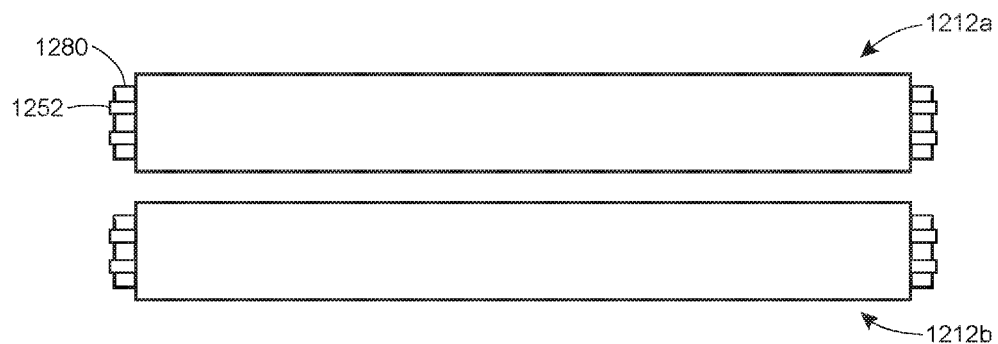
FIG. 28
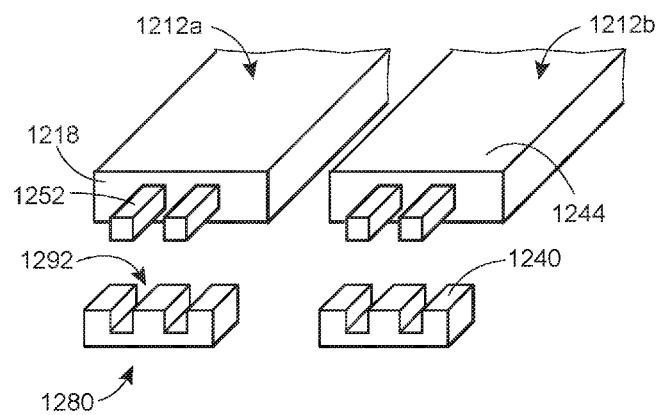 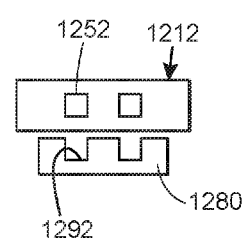
FIG. 29      FIG. 30
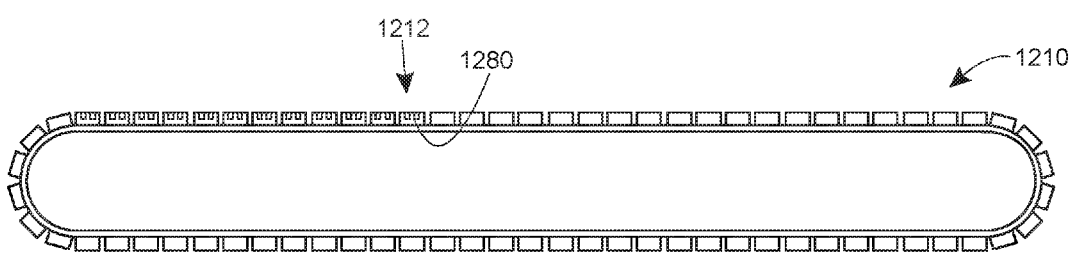
FIG. 31

CONVEYOR BELT SLAT WITH SIDE CARRIER CONNECTION

FIELD OF THE INVENTION

The disclosure is generally directed to conveyor belts, and is more specifically directed to a conveyor belt including a conveyor belt slat that is coupled to a side carrier along side edges of the conveyor belt slat.

BACKGROUND

In the food preparation industry often food items are prepared, at least partially, by placing the food items on a conveyor belt that transports the food items into a food preparation device, such as a toaster. Such toasters include a heated platen and a slowly rotating conveyor belt. The conveyor belt holds the food item in close proximity to the platen while the conveyor belt simultaneously transports the food item through the preparation device. The length of time the food item is exposed to the heated platen may vary based on the length of the platen and the speed of the conveyor belt. Such toasters may process food items continuously as opposed to household toasters that process food items in batch mode, such as two or four pieces of bread at a time. Conveyor toasters are ill-suited for consumer use because of their size, manufacturing cost, power requirements, and the time required to pre-heat the platen to operating temperature. However, conveyor toasters are preferred by restaurants and food services that require high-volume through-put and consistent heating/toasting.

Conveyor toasters generally include a wire conveyor belt. Wire conveyor belts are ideal for material handling, cooking, icing, slicing breading, cooling, filling, inspecting, and packing of products like breads, rolls, buns, donuts, confections, cakes, pies, pastries, meat, seafood, poultry, and other processed foods. The simple, open design of wire conveyor belts provides efficient operation with minimum maintenance and easy cleanup to meet sanitation requirements. The wire conveyor belt may include a plurality of spaced metal rods interconnected by coupling "hook" and "loop" connection elements formed at the rod ends of adjacent metal rods. The rods may support a food item and the rods may hold the components of the belt together by way of the interconnected hook and loop connection elements.

One known conveyor belt, for example, is the wire conveyor belt disclosed in U.S. Pat. No. 7,987,972, which is herein incorporated by reference in its entirety. The wire conveyor belt provides a flat support surface, but is relatively expensive to produce and is cumbersome to assemble and relatively difficult to repair or replace in the field. The plates are attached to a first spaced rod at a first end and to a second spaced rod that is adjacent to the first spaced rod at the second end.

SUMMARY

In accordance with one exemplary aspect, a conveyor belt includes a plurality of slats, at least one slat having a base for carrying an item, the base having a first opposing end and a second opposing end, the first opposing end and the second opposing end being substantially parallel to the direction of conveyance travel of the conveyor belt. At least one side carrier is coupled to at least one of the first and the second opposing ends of the at least one slat by a coupling mechanism.

In accordance with another exemplary aspect, a conveyor belt includes a plurality of slats, at least one slat having a base for carrying an item, the base having a first opposing end and a second opposing end, the first opposing end and the second opposing end being substantially parallel to the direction of conveyance travel of the conveyor belt. At least one side cable is coupled to at least one of the first and the second opposing ends of the at least one slat by a coupling mechanism.

In accordance with another exemplary aspect, a conveyor belt includes a plurality of slats, at least one slat having a base for carrying an item, the base having a first opposing end and a second opposing end, the first opposing end and the second opposing end being substantially parallel to the direction of conveyance travel of the conveyor belt. At least one side timing belt is coupled to at least one of the first and the second opposing ends of the at least one slat by a coupling mechanism.

In accordance with yet another exemplary aspect, a conveyor belt includes a plurality of slats, at least one slat having a base for carrying an item, the base having a first opposing end and a second opposing end, the first opposing end and the second opposing end being substantially parallel to the direction of conveyance travel of the conveyor belt. At least one side timing chain is coupled to at least one of the first and the second opposing ends of the at least one slat by a coupling mechanism.

BRIEF DESCRIPTION OF THE DRAWINGS

FIG. 17 is a perspective view of a ninth embodiment of a conveyor belt assembly constructed in accordance with the teachings of the disclosure.

FIG. 18A is a side view of a slat of the conveyor belt assembly of FIG. 17.

FIG. 18B is a cross-sectional view of a belt of the conveyor belt assembly of FIG. 17.

FIG. 18C is a front view of an end of a slat of the conveyor belt assembly of FIG. 17.

FIG. 21 is a perspective view of an eleventh embodiment of a conveyor belt assembly constructed in accordance with the teachings of the disclosure.

FIG. 22 is a top view of a timing chain of the conveyor belt assembly of FIG. 21.

FIG. 23A is a top view of the timing chain of FIG. 22 and a slat.

FIG. 23B is a close up top view of the timing chain and slat of FIG. 23A.

FIG. 28 is a top view of two slats of a thirteenth embodiment of a conveyor belt assembly constructed in accordance with the teachings of the disclosure.

FIG. 29 is an end perspective view of the two slats of FIG. 28.

FIG. 30 is a side view of one of the slats of FIG. 29.

FIG. 31 is a side view of the conveyor belt assembly of FIG. 28.

DETAILED DESCRIPTION

Figure 1:
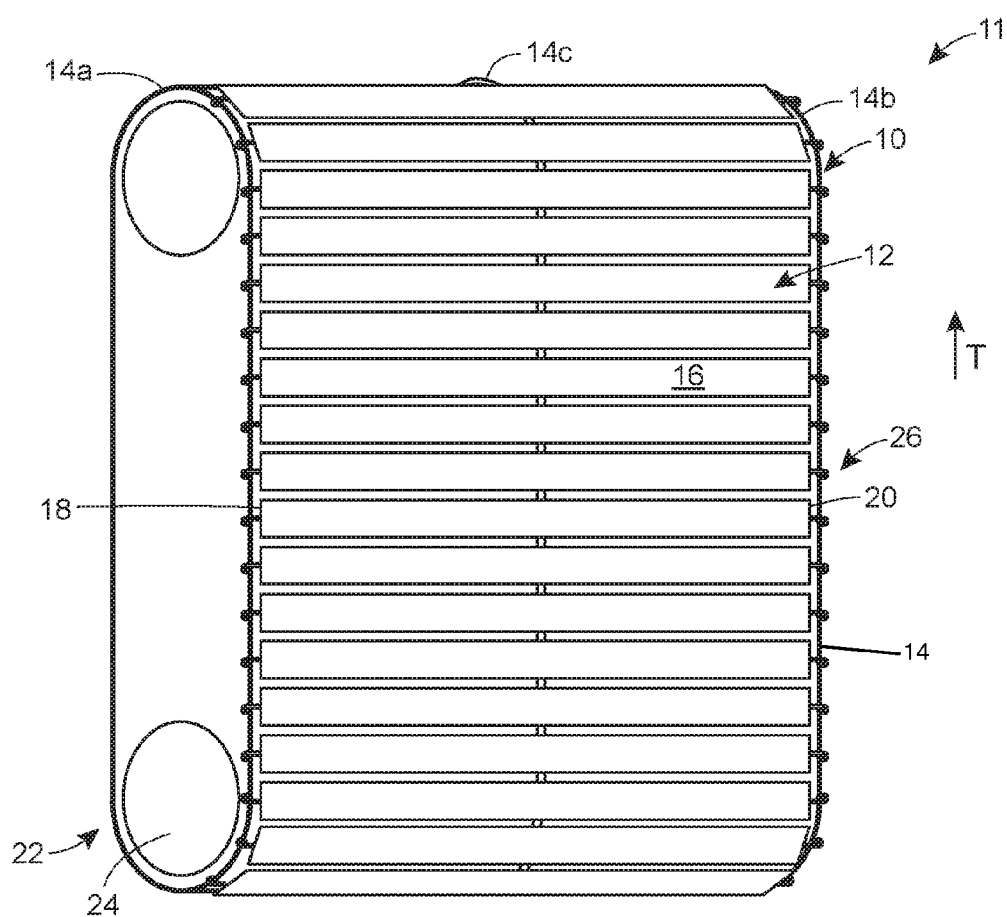
FIG. 1 is a perspective view of a first embodiment of a conveyor belt assembly constructed in accordance with the teachings of the disclosure.

A conveyor belt 10 comprises a plurality of slats 12 connected to a side carrier 14 that together form a continuous, conveyor belt surface. Each slat 12 includes a base 16 for carrying an item, the base 16 having a first and a second opposing end 18, 20 that are substantially parallel to the direction of conveyance travel T of the conveyor belt 10. Each slat 12 is coupled to at least one side carrier 14 at one of the first and the second opposing ends 18, 20 of the slat 12.

Cable

The first group of embodiments includes at least one cable as the side carrier 14 that is connected to a plurality of slats 12 to form a continuous conveyor belt 10. In a preferred embodiment, the plurality of slats 12 are connected to a first cable 14a and a second cable 14b at first and second opposing ends 18, 20 of the slat 12. In another embodiment, the plurality of slats 12 may be connected to a third cable 14c that runs along the length of a conveyor belt loop 22 and connects to the slats 12 at a central location on a bottom surface 32 of a base 16 of each slat 12. The cables 14a, 14b, 14c rotate about the conveyor belt loop 22 and are driven by a driving mechanism 24, such as a roller or a sprocket.

Figure 2A:
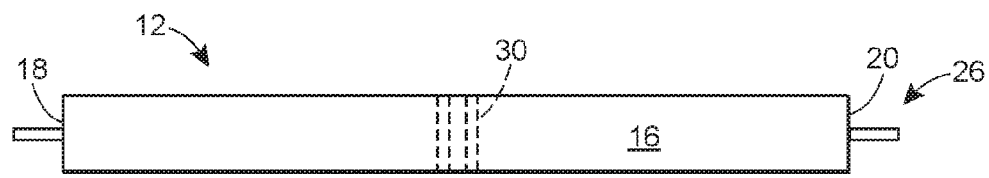
FIG. 2A is a top view of one slat of the conveyor belt assembly of FIG. 1.
Figure 2B:
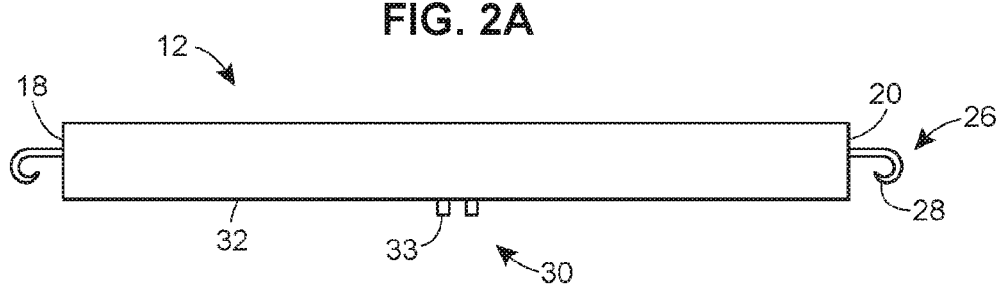
FIG. 2B is a side view of the slat of FIG. 2A.

In the first embodiment, the first and second opposing ends 18, 20 of a slat 12 couple to first and second cables 14a, 14b respectively. FIG. 1 illustrates a perspective view of a conveyor belt assembly 11 with a first, second, and third cables 14a, 14b, 14c and a plurality of slats 12 connected to the first, second, and third cables 14a, 14b, 14c. Each slat 12 has the base 16 with the first opposing end 18 and the second opposing end 20, the first and second opposing ends 18, 20 connect to the first and second cables respectively 14a, 14b. FIG. 2A is a top view of one slat 12 of the plurality of slats 12 of the conveyor belt 10 in FIG. 1. A locking or clamp mechanism 26 extends from each of the opposing ends 18, 20 of the base 16 to connect to the first and second cables 14a, 14b. For example, and as best illustrated in FIG. 2B, the slats 12 connect to the cable 14a, 14b via the clamp mechanism 26 in the shape of a hook 28 on the first and second opposing ends 18, 20. In this example, the hooks 28 allow a user to clip the slats 12 onto the first and second cables 14a, 14b and slide the slat 12 into a desired position. In another example, the hook may be configured to clamp onto the cable and lock in place. A guide member 30 is formed in a bottom surface 32 of the base 16 of the slat 12, the guide member 30 aligns with the third cable 14c of the conveyor belt assembly 11. The guide member 30 includes at least one projecting tab 33 that is configured to slidably couple to the third cable 14c. The guide member 30 ensures that each slat 12 is aligned with the plurality of slats 12 of the conveyor belt 10 and travels in a direction perpendicular to the direction of conveyance travel T of the conveyor belt 10.

Figure 3:
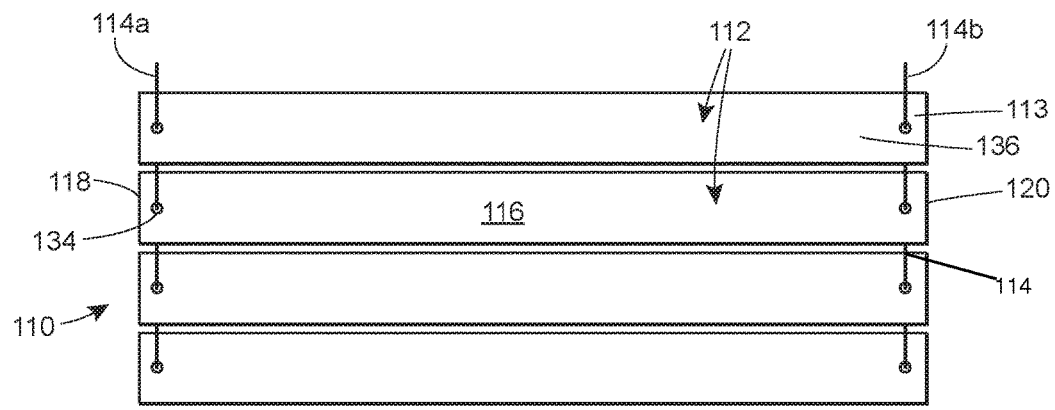
FIG. 3 is a partial plan view of a second embodiment of a conveyor belt assembly constructed in accordance with the teachings of the disclosure.

In a different embodiment of a conveyor belt 110, illustrated in FIG. 3, a side carrier 114 traverses through at least one of a first and second opposing ends 118, 120 of the plurality of slats 112. FIG. 3 illustrates a partial view of a conveyor belt 110 with multiple slats 112 coupled to a first cable 114*a* and to a second cable 114*b*. Each slat 112 has a base 116 with a first opposing end 118 coupled to the first cable 114*a* and a second opposing end 120 coupled to the second cable 114*b*. The first and second cables 114*a*, 114*b* couple to the first and second ends 118, 120 of each slat 112 by weaving through an aperture 134 formed in the first and second ends 118, 120 of the slat 112. The term "weaving" is merely illustrative and is used herein to describe how the cable 114 or side carrier 114 traverses through the aperture 134 of the slat 112 from a bottom surface 132 of the slat 112, crosses over a top surface 136 of the slat 112, and dips under an adjacent slat 113 before traversing through an aperture 134 of the adjacent slat 113. Weaving is merely describing how a carrier mechanism 114 connects multiple slats 112 of a conveyor belt 110 together and it is not meant to be limited to the illustration in FIG. 3.

Figure 4A:
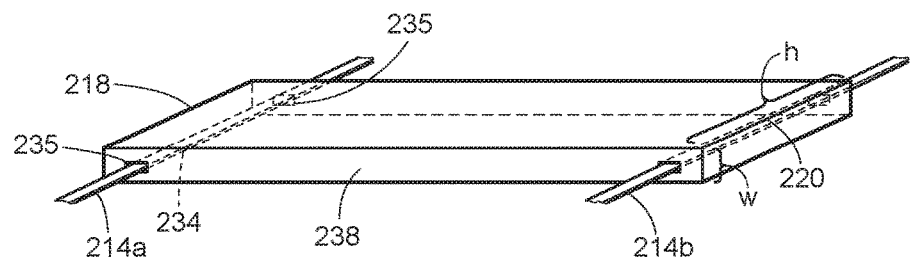
FIG. 4A is a side perspective view of a third embodiment of a conveyor belt assembly constructed in accordance with the teachings of the disclosure.
Figure 4B:
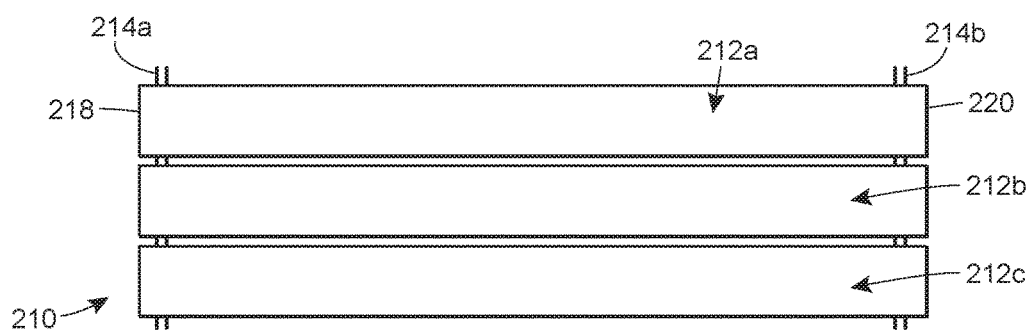
FIG. 4B is a top plan view of the conveyor belt assembly of FIG. 4A.

FIGS. 4A-4B illustrate an embodiment of a conveyor belt 210 having a first and a second cable 214*a*, 214*b* that traverse through a bore 234 formed in a first end 218 and a bore formed in a second end 220 of a slat 212. The perspective view of the slat 212 and cables 214*a*, 214*b* in FIG. 4A illustrates how the bore 234 is formed in a width w of the slat 212 and runs through a height h of the slat 212 at both the first and second ends 218, 220 of the slat 212. The bore 234 forms first and second openings 235 at front and back side surfaces 238 of the slat 212. Although FIG. 4A illustrates a slight clearance about the first and second cables 214*a*, 214*b* in the opening 235, the bore 234 is wide enough for the cables 214*a*, 214*b* to pass through, but sized so that once the slat 212 is attached to the cables 214*a*, 214*b* the slat 212 does not slide out of position. In this example, the cables 214*a*, 214*b* provide the driving means for the slats 212 and the slats 212 rotate about a conveyor belt loop (not shown) as the cables 214*a*, 214*b* rotate about the conveyor belt loop. In another example, the cables 214*a*, 214*b* remain stationary and the slats 212 are driven about a loop by a driving mechanism 232, such as a sprocket, and the slats 212 are free to slide on the cables 214*a*, 214*b* as the slats 212 move. FIG. 4B illustrates a top view of a first slat 212*a*, a second slat 212*b*, and a third slat 212*c* connected by the first cable 214*a* and the second cable 214*b* running through the width w of each slat 212 of the first and second ends 218, 220.

Figure 5:
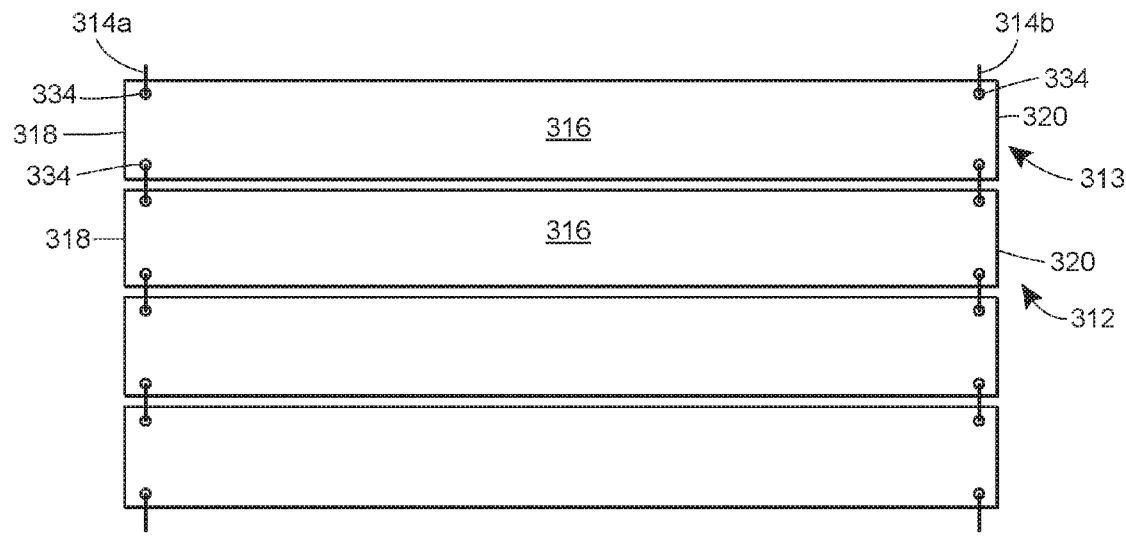
FIG. 5 is a partial plan view of a fourth embodiment of a conveyor belt assembly constructed in accordance with the teachings of the disclosure.
Figure 6:
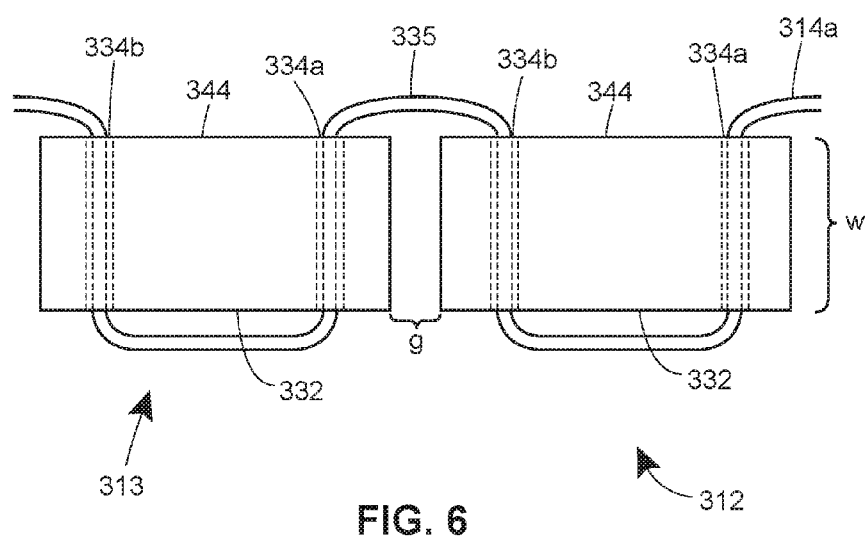
FIG. 6 is a side view of a first slat and a second slat of the conveyor belt assembly of FIG. 5, the first and second slats being woven together by a cable.

FIG. 5 similarly illustrates first and a second side carriers 314*a*, 314*b* traversing through first and second ends 318, 320 of a plurality of slats 312. Each slat 312 has a base 316 having a first opposing end 318 and a second opposing end 320. In each opposing end 318, 320, first and second apertures 334 are formed and extend through a width w of the slat 312. The first and second cables 314*a*, 314*b* weave through the first and second apertures 334 at each opposing end 318, 320 of the slat 312 to connect multiple slats 312 to form a conveyor belt 310. FIG. 6 illustrates a side view of a first slat 312 and a second slat 313 woven together by a cable 314*a*. Beginning at the right side of FIG. 6, the cable 314*a* traverses through a first aperture 334*a* a distance of a width w of the first slat 312 from a top surface 344, crosses a bottom surface 332 of the first slat 312, traverses through a second aperture 334*b* a distance of the width w of the first slat 312, crosses over a gap g located in between the first and second slats 312, 313 and traverses through a first aperture 334*c* in the second slat 313. The cable 314 creates a bridge 335 as it crosses over the gap g between the first and second slats 312, 313. FIG. 6 illustrates the gap g, however, the gap g may be minimized by tightening the cable 314 and thereby pulling the slats 312, 113 closer together. FIGS. 5-6 illustrate a conveyor belt 310 including cables 314, however, the slats 312 may be woven together using a spring or a linking mechanism that serves to link the adjacent slats together by weaving in and out of the apertures.

Figure 7A:
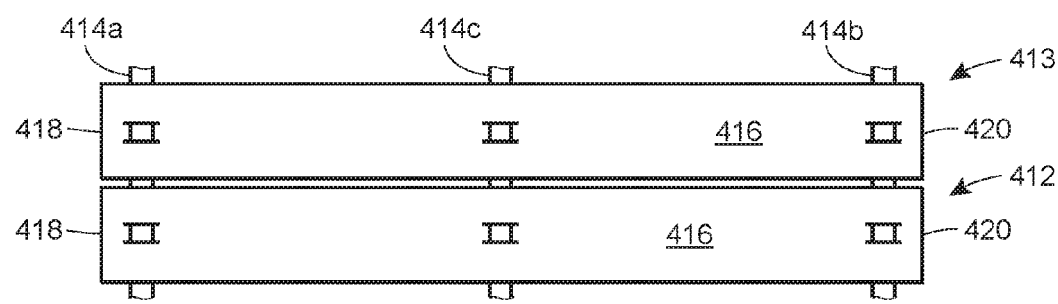
FIG. 7A is a partial plan view of a fifth embodiment of a conveyor belt assembly constructed in accordance with the teachings of the disclosure
Figure 7B:
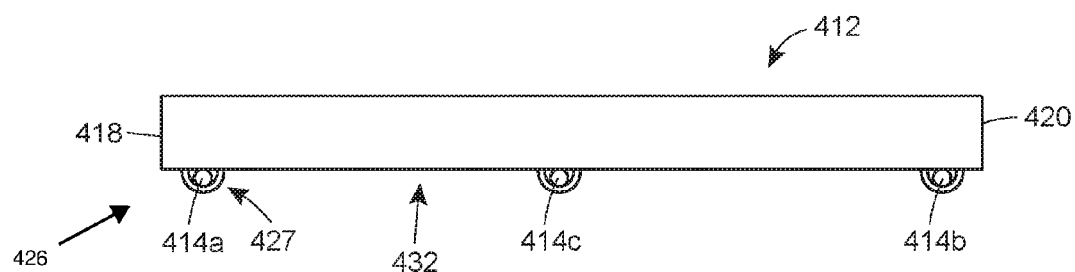
FIG. 7B is a front view f a slat of the conveyor belt assembly of FIG. 7A.

Turning now to FIG. 7A, a first and a second slat 412, 413 are adjacent and connected by first, second, and third cables 414*a*, 414*b*, 414*c*. Each slat 412 provides a coupling mechanism 426 in the shape of a knuckle 427, or a portion of a base 416 of the slat 412 that overlaps with a portion of the cable 414. Each slat 412 may have a knuckle 427 formed within the base 416 of the slat 412 at a first opposing end 418, a second opposing end 420, and in the center of the slat 412. Best illustrated in the front view of the slat 412 in FIG. 7B, the knuckle 427 is a part of the base 416 of the slat 412 and extends in a U-shaped loop from a bottom surface 432 of the slat 412. Each knuckle 427 forms the U-shaped loop in the bottom surface 432 of the base 416 of the slat 412 so that each cable 414 runs adjacent the bottom surface 432 of the slat 412 until the cable traverses the knuckle 427, whereby a portion of the cable is exposed at a top surface 444 of the slat 412.

The cable may be made of a variety of materials including a woven fabric, a polymer, or a metal wire. The material of the cable depends on the specification of the toaster and conveyor belt, including speed and temperature requirements. The cable may also be a spring or a spring-like wire.

Timing Belt

The second group of embodiments includes at least one belt, a timing belt, flat belt, or otherwise, as the carrier means 514 that is connected to a plurality of slats 512 to form a conveyor belt 510. A typical belt 514 may be driven by a number of different driving mechanisms 532, such as a roller, a pulley, or a sprocket, etc. This group of embodiments is illustrated with either a regular belt or a conventional timing belt as they can be used interchangeably. A conventional timing belt, for example, has an outer surface that interacts with a slat for carrying an object, and an inner surface that provides corrugations or teeth that mate with a plurality of furrows of a sprocket. The belt 514 may be made of rubber with high-tensile fibers running the length of the belt 514. Others may be made of a high temperature resistant material such as highly saturated nitrile. Other belts may be made of steel, polymer, or woven fabric.

Figure 8:
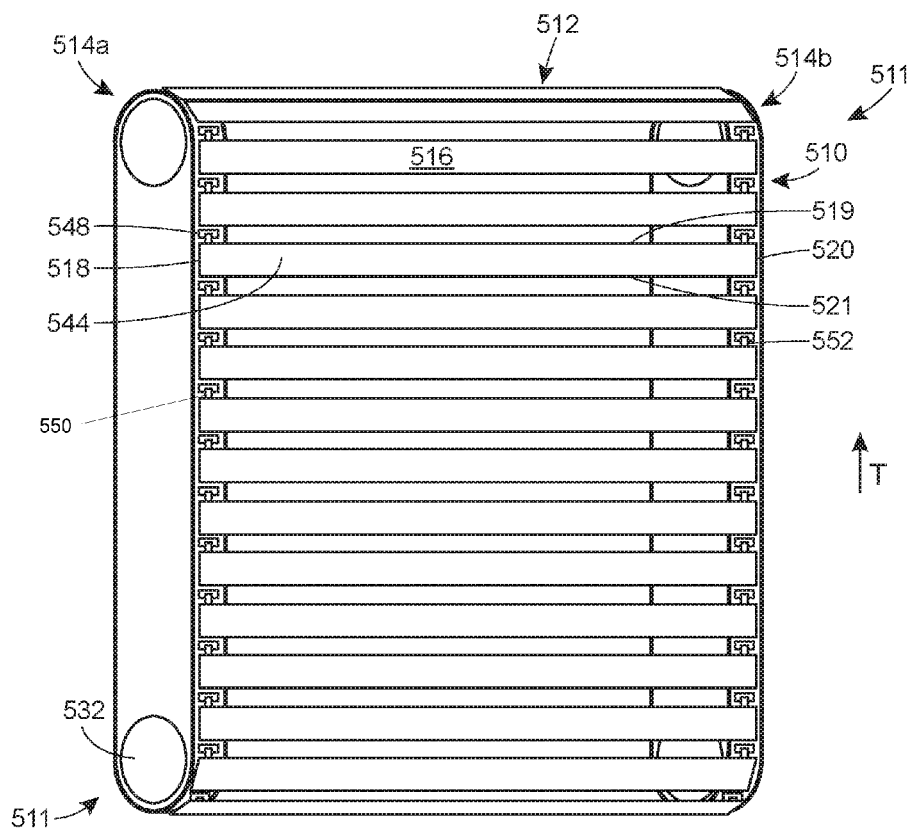
FIG. 8 is a perspective view of a sixth embodiment of a conveyor belt assembly constructed in accordance with the teachings of the disclosure
Figure 9:
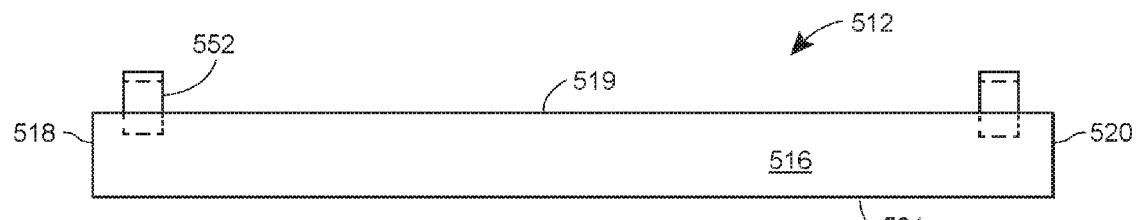
FIG. 9 is a top view of a slat of the conveyor belt assembly of FIG. 8.
Figure 10:
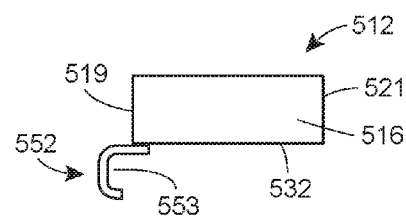
FIG. 10 is a side view of the slat of FIG. 9.

In the first embodiment illustrated in FIGS. 8-10 of the second group, a conveyor belt 510 comprises a plurality of slats 512 attached to first and second belts 514*a*, 514*b*. Each slat 512 includes a base 516 for carrying an item, the base 516 includes a top surface 544, a first opposing end 518, a second opposing end 520, a leading edge 519, and a trailing edge 521. The first and second opposing ends 518, 520 are substantially parallel to the direction of conveyance travel T of the conveyor belt 510, and the leading edge 519 and trailing edge 521 are substantially perpendicular to the direction of conveyance travel T of the conveyor belt 510. The leading edge 519 is the first edge of the leading and trailing edges 519, 520 to rotate about a conveyor belt loop 511. In FIG. 8, the first and the second opposing ends 518, 520 include at least one of a female part 548 and a male part 550 adapted to couple to the at least one side carrier 514 having the other of the female part 548 and the male part 550. In the illustrated example, each slat 512 comprises a first tab 552 formed in a bottom surface 532 of the slat 512 and projecting from the leading edge 519 at the first opposing end 518 of the slat 512. A second tab 552 is formed in the bottom surface 532 of the slat 512 and projects from the leading edge 519 at the second opposing end 520 of the slat 512. A hook 553 or clip is formed on distal end of each tab 552 and is configured to clip on to the female part 548 formed in the first and second belts 514a, 514b.

The female and male parts 548, 550 that couple the slats 512 to the belts 514 may take a variety of forms. In the illustrated embodiment, the male part 550 is a tab 552 and a hook 553 and the female part 548 is a rectangular opening formed in each belt 514 and sized to receive the hook 553 of the slat 512. FIG. 9 illustrates a top view of the slat 512 with the first and second tabs 352 located at the first and second opposing ends 518, 520 of the slat 512 and formed in the leading edge 519 of the slat 512. FIG. 10 best illustrates the hook 553 formed at the distal end of each tab 552 that is configured to hook onto an opening 548 the in belts 514. More specifically, the hook 553 projects from the bottom surface 532 of the slat 512 at the first end 518. Alternatively, the male part 550 may be a key and the female part 548 may be a key slot where the male part 550 can slip into the female part 548 and shift so that the male part 550 and the female part are locked together.

In another embodiment, the plurality of slats may be shaped to reduce the gaps between the slats 512. Instead of providing straight edges at the leading edge 519 and trailing edge 521 as illustrated in FIG. 8, an embodiment may provide a slat 512 having a leading edge 519 that mates with a trailing edge 521 of an adjacent slat 512. For example, a mating feature could be a first and second mating jigsaw surfaces.

Figure 11:
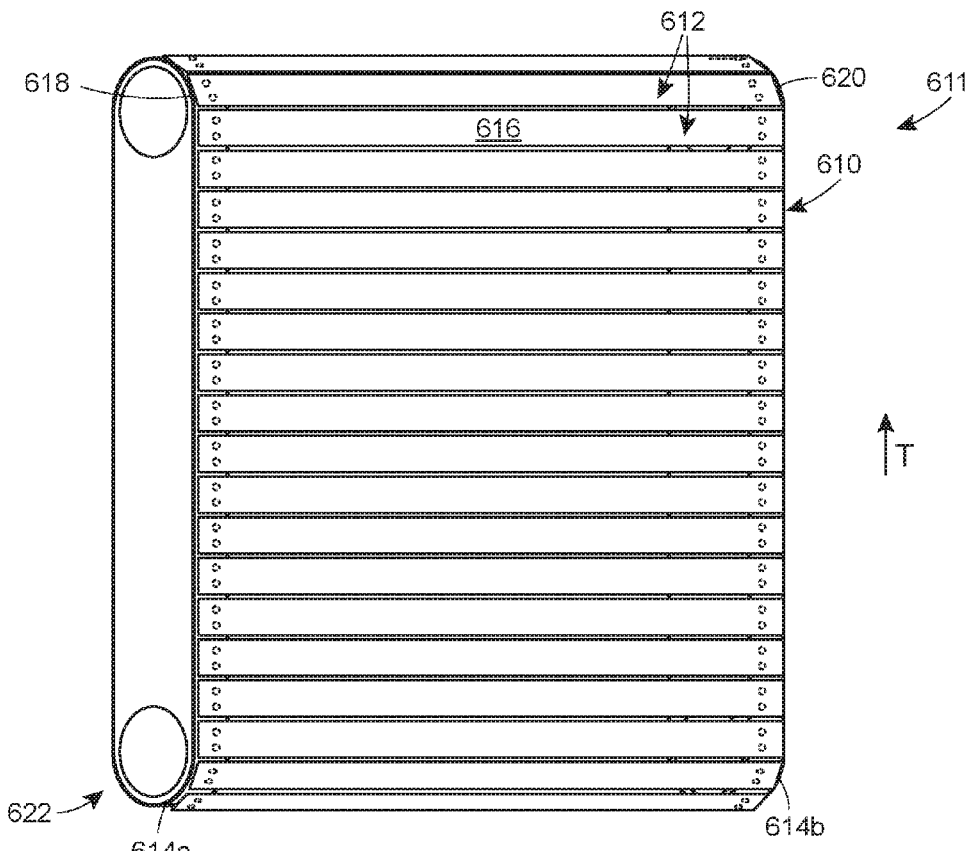
FIG. 11 is a perspective view of a seventh embodiment of a conveyor belt assembly constructed in accordance with the teachings of the disclosure.
Figure 12:
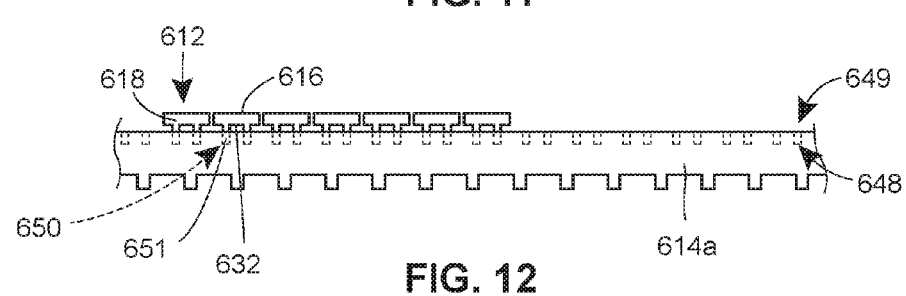
FIG. 12 is a side view of a plurality of slats of the conveyor belt assembly of FIG. 11.
Figure 13:
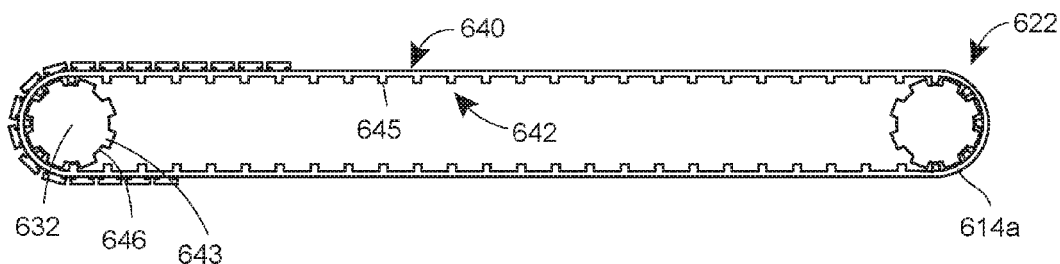
FIG. 13 is a side view of a timing belt of the conveyor belt assembly of FIG. 11.

Turing now to FIGS. 11-13, a conveyor belt 610 includes first and second belts 614a, 614b attached to a plurality of slats 612. Each slat 612 has a base 616 for carrying an item, first and second opposing ends 618, 620 that attach to the first and second belts 614a, 614b respectively. A male part 650 projects from a bottom surface 632 of the base 616 of the slat 612 in the form of a plurality of pegs 651, wherein each peg 651 is configured to mate with a female part 648 formed in the first and second belts 614a, 614b. The female part 648 formed in an outside surface 640 of the first and second belts 614a, 614b comprise a plurality of apertures 649 sized to receive the plurality of pegs 651 formed in the first and second ends 618, 620 of the slats 612. FIG. 12 is a magnified side view of a plurality of slats 612 coupled to the first belt 614a, a timing belt, at the first end 618 of the slats 612. Each slat 612 couples to the timing belt 614a by mating the pegs 651 of the slat 612 to the apertures 649 of the belt 614a. FIG. 13 is a side view of the timing belt 614a coupled to a plurality of slats 612 and driven by a first and second sprocket 632 at first and second loops 622 of the conveyor belt 610. A plurality of teeth 645 formed on an inside surface 642 of the timing belt 614a is engaged by a plurality of furrows 646 of the first and second sprocket 632.

Figure 14:
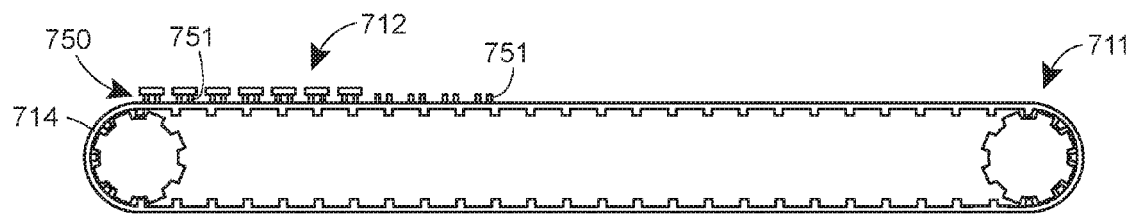
FIG. 14 is a side view of an eighth embodiment of a conveyor belt assembly constructed in accordance with the teachings of the disclosure.
Figure 15:
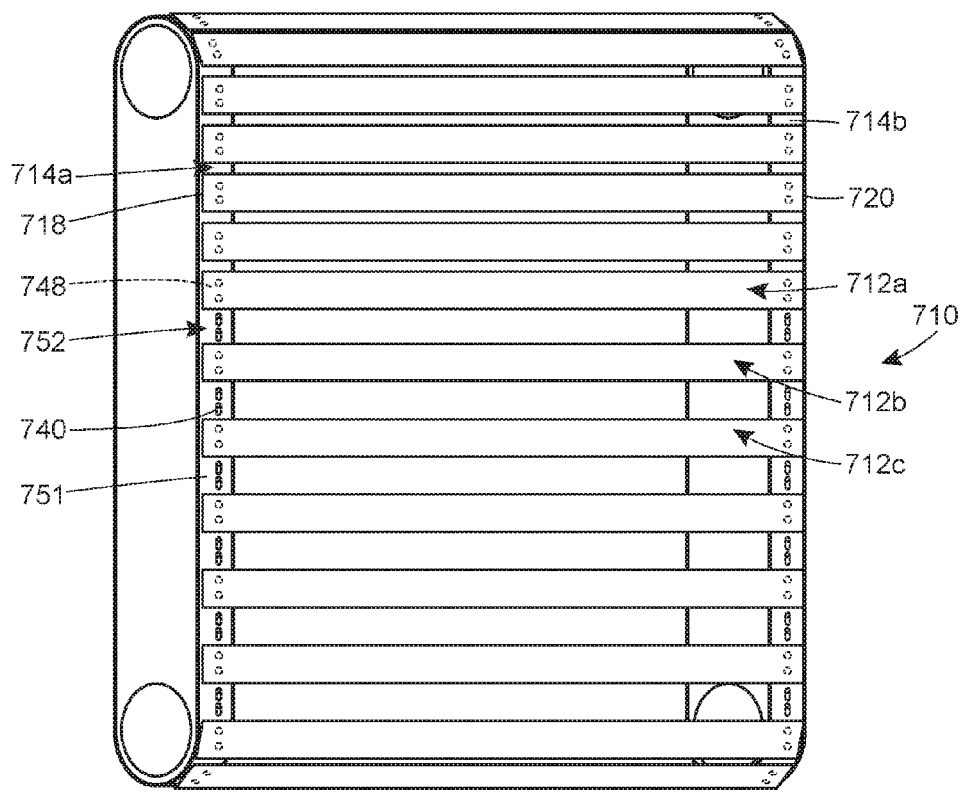
FIG. 15 is a perspective view of the conveyor belt assembly of FIG. 14.
Figure 16:
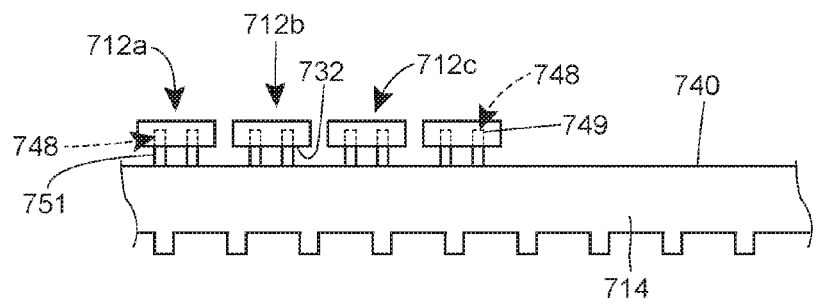
FIG. 16 is a side view of a plurality of slats of the conveyor belt assembly of FIG. 14.

Turning now to FIGS. 14-16, a conveyor belt assembly 711 comprises a plurality of slats 712 coupled to at least one timing belt 714. This embodiment is similar to the previously described embodiment, however, a male part 750 of this embodiment is formed in a top surface 740 of the timing belt 714 and a female part 748 is formed in first and second opposing ends 718, 720 of the slats 712. The male part 750 comprises a plurality of pegs 751 extending vertically from the top surface 740 of the conveyor belt 714. The first and second opposing ends 718, 720 of the slat 712 provide corresponding apertures 749 that are sized to receive the pegs 751 of the belt 714. FIG. 15 illustrates a perspective view of the conveyor belt 710 including first, second, and third slats 712a, 712b, 712c coupled to first and second belts 714a, 714b. This embodiment allows a user to customize the conveyor belt by placing the slats 712 on the conveyor belt 710 at a preferred location. For example, the first and second slats 712a, 712b are spaced apart by a row 752 of pegs 751 formed in the belt 714a. FIG. 16 is a side view of the first, second, and third slats 712a, 712b, 712c coupled to the belt 714 without a row of pegs separating the slats 712. Alternatively, the slats 712 may be spaced further apart so that a different slat 712 (not shown) having the same female part 748 in the first and second opposing ends 718, 720 may fit between the other slats 712.

FIGS. 17-18 illustrate a conveyor belt assembly 811 having a plurality of slats 812 attached to first and second belts 814a, 814b. The first and second belts 814a, 814b are disposed on an interior 856 of first and a second opposing ends 818, 820 of the plurality of slats 812 such that the plurality of slats 812 partially overlap the first and second belts 814a, 814b. In other words, each opposing end 818, 820 of the slats 812 extend beyond an outer edge 858 of each belt 814, and wrap around the belt 814 so that the slat 812 crimps the belt 814 at outside and inside surfaces 840, 842 of the belt 810.

FIG. 18A illustrates a side view of a slat 812 crimped to a first conveyor belt 814a at the first end 818 of the slat 812. A top surface 844 of the first opposing end 818 the slat 812 curves around the outer edge 858 of the belt 814a to form a loop 860. FIG. 18B illustrates a cross-sectional view of the belt 814 sandwiched between the top surface 844 of a base 816 of the slat 812 and a distal end 862 of the slat. FIG. 18C illustrates a front view of the first end 818 of the slat 812 and how the top surface 844 of the base 816 folds around the outer edge 858 of the belt 814 and forms the loop 860 around the belt 814. The distal end 862 of the slat 812 mates with a bottom surface 832 of the base 816 of the slat 812.

Figure 19:
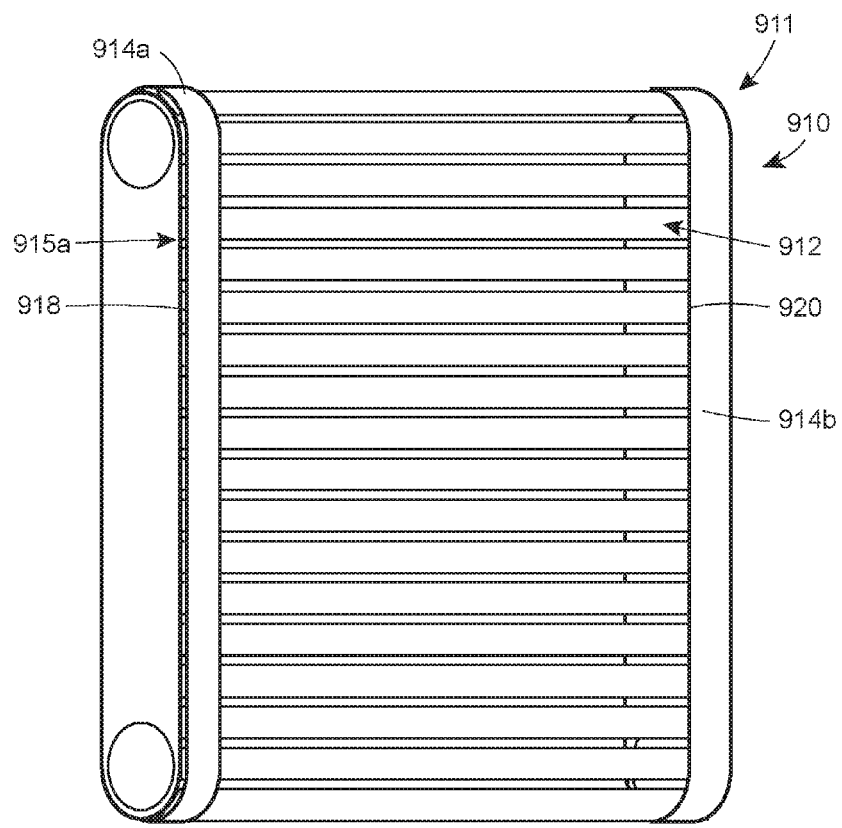
FIG. 19 is a perspective view of a tenth embodiment of a conveyor belt assembly constructed in accordance with the teachings of the disclosure.
Figure 20:
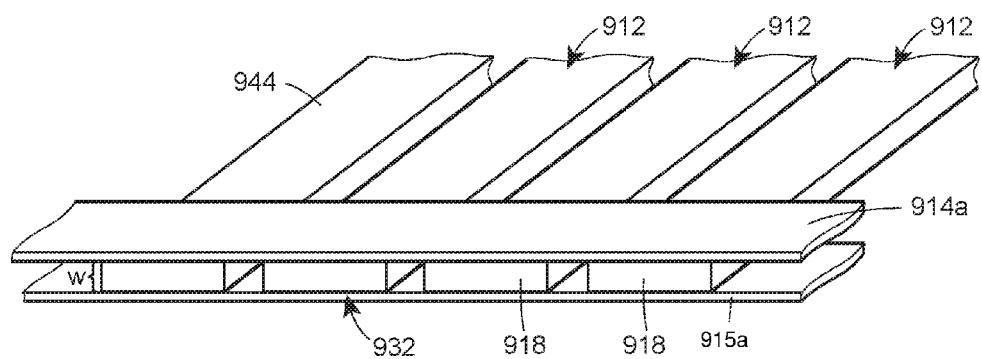
FIG. 20 is a perspective view of top and bottom belts of the conveyor belt assembly of FIG. 19.

FIGS. 19-20 illustrate another embodiment of a conveyor belt 910 comprising a plurality of slats 912 attached to a side carrier means 914a, 914b, 915a, 915b. More specifically, FIG. 19 is perspective view of conveyor belt assembly 911 where the slats 912 are crimped in place by the carrier means 914a, 914b, 915a, 915b. The conveyor belt assembly 911 includes a first top belt 914a and a first bottom belt 915a attached to a first opposing end 918 of each slat 912 and a second top belt 914b and a second bottom belt 915b attached to a second opposing end 920 of each slat 912. The top and bottom belts 914, 915 are parallel and spaced apart by a width w of each slat 912. Best illustrated in FIG. 20, the first top belt 914a attaches to a top surface 944 of the first opposing ends 918 of the slats 912. The first bottom belt 915a attaches to a bottom surface 932 of the first opposing ends 918 of the slats 912. The top and bottom belts 914a, 914b, 915a, 915b effectively sandwich the slats 912 in place.

Timing Chain Carrier

As illustrated in FIGS. 21-23, a third group of embodiments includes a plurality of links 1080 coupled to a plurality of slats 1012 wherein the links 1080 are carried by side carrier means 1014 to form a conveyor belt 1010. The side carrier means 1014 may be a belt or a cable, but the following embodiments are coupled to a timing chain, as illustrated in FIG. 21. A timing chain 1014 comprises multiple interlocking links 1084 that may be engaged by or driven by a sprocket or gear 1032. A conventional timing chain 1017 is a bicycle chain and a portion of which is illustrated in FIG. 22, and a timing chain with flanges is illustrated in FIGS. 23A-23B. A slat 1012 comprises a base 1016 for carrying an item, the base 1016 including first and second opposing ends 1018, 1020. The first and second opposing ends 1018, 1020 couple to first and second side carriers 1014a, 1014b via a tab or link 1080. For example, FIG. 23A illustrates first and second slats 1012a, 1012b attached to a timing chain 1014 via a flange 1082. The flange 1082, or link 1080 in this case, is carried by the timing belt 1014 and is configured to couple to the first opposing end 1018 of each slat 1012. A second timing chain 1014b likewise having a plurality of flanges 1082, couples to the second opposing end 1020 of each slat 1012. FIG. 23B also illustrates how the first end 1018 of the slat 1012 couples to the timing chain 1014 via the flange 1082.

Figure 24:
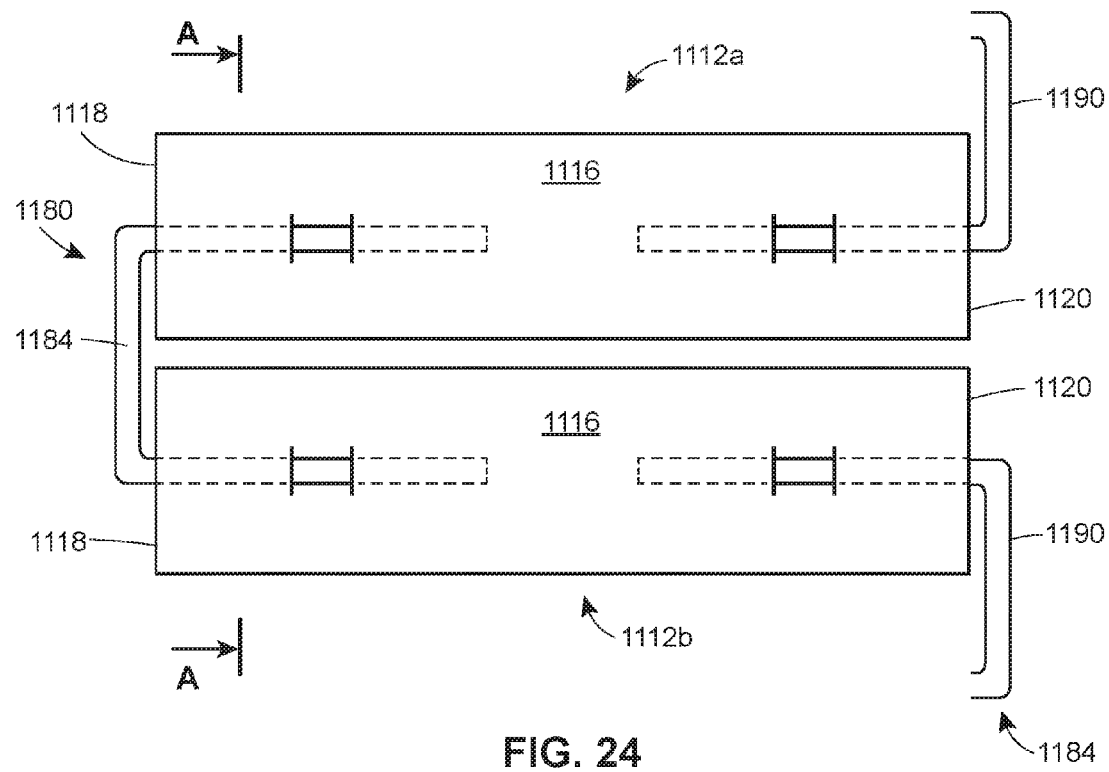
FIG. 24 is a top view of two slats of a twelfth embodiment of a conveyor belt assembly constructed in accordance with the teachings of the disclosure.
Figure 25:
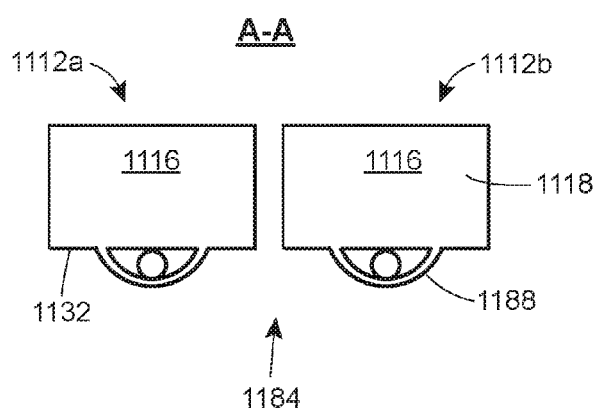
FIG. 25 is a cross-sectional view of the slats of FIG. 24.
Figure 26:
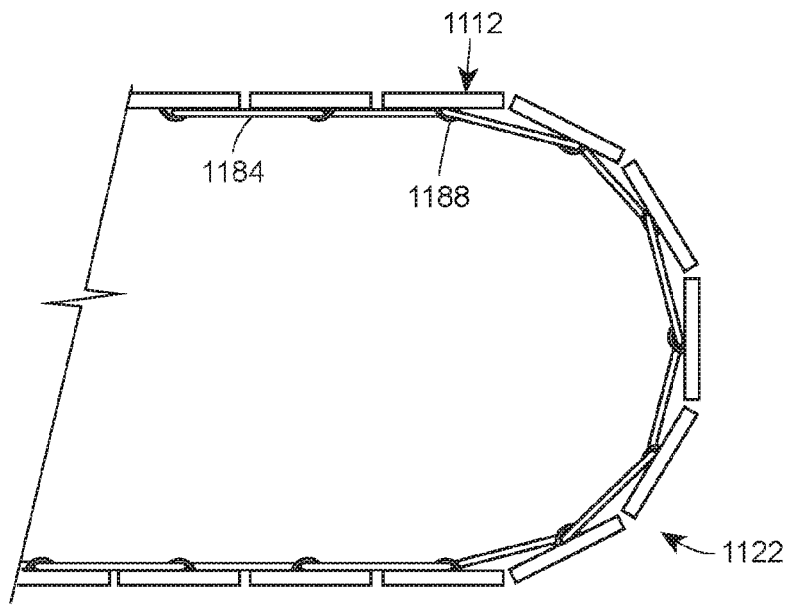
FIG. 26 is a partial side view of the conveyor belt assembly of FIG. 24.
Figure 27:
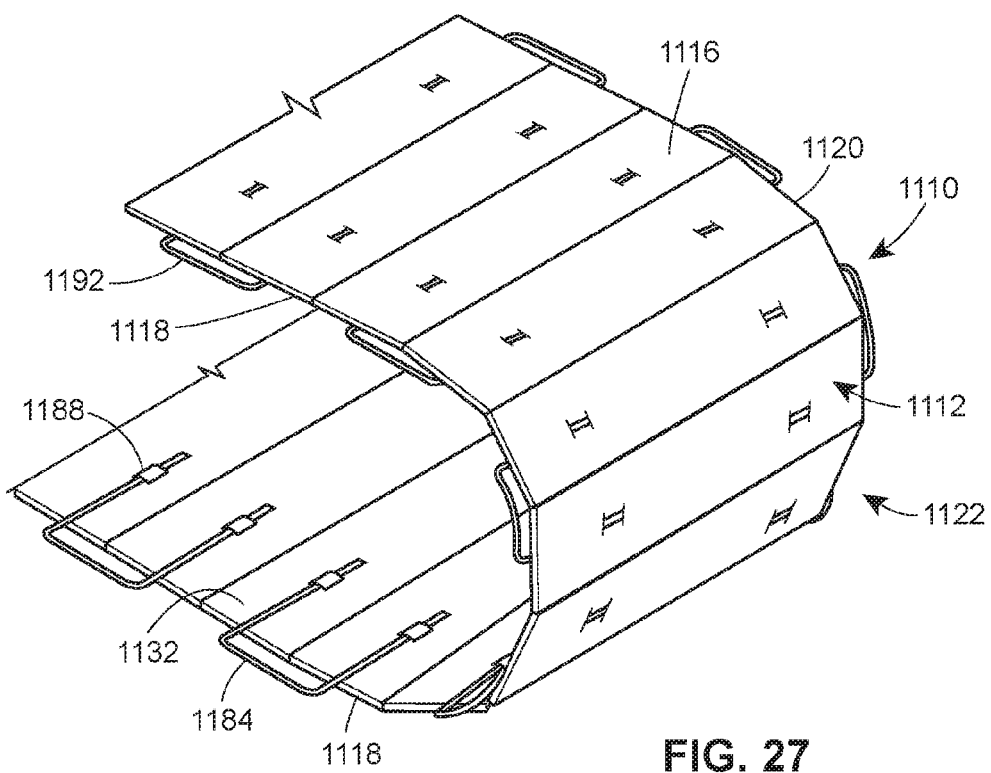
FIG. 27 is a partial perspective view of the conveyor belt assembly of FIG. 24.

In a preferred embodiment, a link 1180 is not a flange, but a U-bar 1184 that couples a first slat 1112a to a second, adjacent slat 1112b, as illustrated in FIGS. 24-27. FIG. 24 is a top view of the first slat 1112a and the second slat 1112b attached together by a link 1180 in the form of a U-shaped bar 1184. The U-shaped bar 1184 extends from a first end 1118 of the first and second slats 1112a, 1112b and couples to each slat 1112 by traversing through a knuckle 1188 formed in a base 1116 of each slat 1112. At a second end 1120 of the first and second slats 1112a, 1112b, an arm 1190 of a second U-bar 1184 is coupled to the first slat 1112a, and a third U-bar 1184 is coupled to the second slat 1112b. The U-bar 1184 coupled at the first end 1118 of the first and second slats 1112a, 1112b couples the adjacent slats 1112 and also provides a link 1180 that may be carried by a side carrier. The knuckles 1188 formed in a base 1116 of the first and second slat 1112a, 1112b are best illustrated in the A-A cross-sectional view of FIG. 25. The first slat 1112a has the knuckle 1188, or a cut-out, that extends from a bottom surface 1132 of the base 1116. The arm 1190 of the U-shaped bar 1184 slides through the knuckle 1188 and a part of the arm 1190 is exposed at the knuckle 1188. FIGS. 26 and 27 illustrate a partial view of the conveyor belt 1110 comprising U-bar links 1180 and a plurality of slats 1112 having knuckles 1188. The belt 1110 has a first U-bar 1184 which connects adjacent slats 1112 at the first opposing end 1118, and a second U-bar 1184 which connects adjacent slats 1112 at the second opposing end 1120. FIG. 27 is a perspective view of the partial conveyor belt loop 1122 and best illustrates the U-shaped bars 1184 traversing through a plurality of knuckles 1188 formed in the base 1116 of each slat 1112. While the carrier means 1114 is not illustrated in this figure, an end 1192 of the U-bar 1184 may be coupled to a timing chain 1114.

FIGS. 28-31 illustrate an embodiment of a different link 1280 that operatively couples a belt 1214 with a plurality of slats 1212a, 1212b. FIG. 28 is a top view of a first slat 1212a and a second slat 1212b coupled to a link 1280. The first slat 1212a, which is partially illustrated, includes two pegs 1252 extending from a first opposing end 1218. The link 1280 includes a first and a second groove 1292 that receives the two pegs 1252. The link 1280 is best illustrated in FIG. 29 which depicts an exploded view of the first and second slats 1212a, 1212b with corresponding first and second links 1280. Each link 1280 comprises at least two grooves 1292 that are sized to receive the two pegs 1252 of the slat 1212. FIG. 30 illustrates an exploded side view of the first slat 1212a and the first link 1280, the pegs 1252 are measured to mate with the grooves 1292 of the link 1280. FIG. 31 is a side view of the conveyor belt 1210 having a plurality of links 1280 and a plurality of slats 1212 coupled to the links 1280. Once the slat 1212 mates with the link 1280, a top surface 1240 of the link 1280 and a top surface 1244 of the slat 1212 form a substantially flat surface. In another embodiment, not illustrated here, one peg or more than two pegs may project from the first and second opposing ends of slat to mate with a link having one groove or more than two grooves accordingly.

Figure 32:
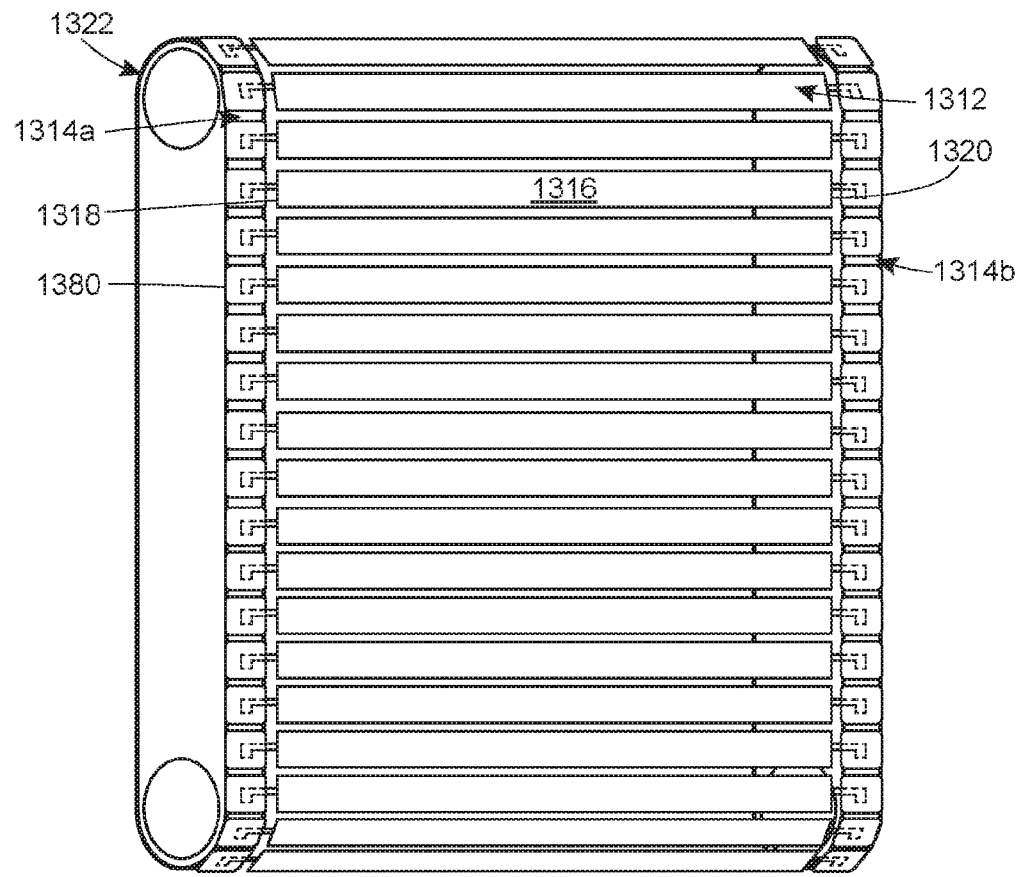
FIG. 32 is a perspective view of a fourteenth embodiment of a conveyor belt assembly constructed in accordance with the teachings of the disclosure.
Figure 33:
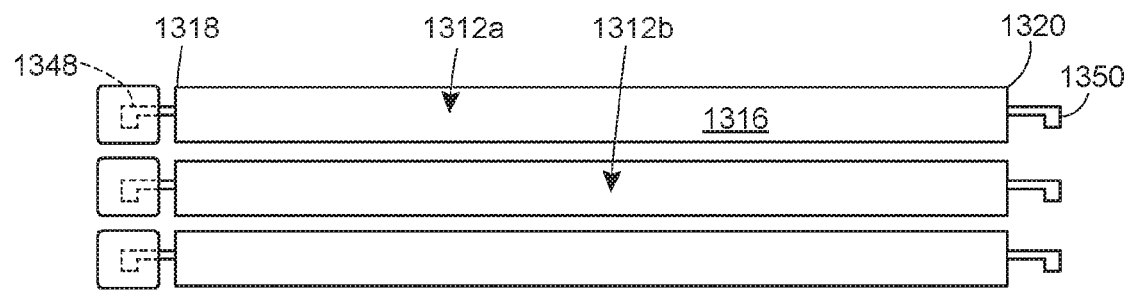
FIG. 33 is a top view of a plurality of slats of the conveyor belt assembly of FIG. 32.

A conveyor belt assembly in FIGS. 32-33 comprises first and second belts 1314a, 1314b coupled to a plurality of slats 1312 via a plurality of links 1380. In this case, the link 1380 comprises a female part 1348 to receive a male part 1350 of the slat 1312. FIG. 33 illustrates a partially coupled first and second slats 1312a, 1312b. Each slat 1312 includes a base 1316, the base 1316 having first and second opposing ends 1318, 1320 that couple to the links 1380 carried by the belts 1314a, 1314b. The first end 1318 of the slat 1312 is coupled to the link 1380, the second end 1320 of the slat is not yet coupled to a link 1380 in order to illustrate the male part 1350 of the slat 1312. Rather than a plurality of pegs, the slat 1312 includes a hook 1350 that extends from the first and second opposing ends 1318, 1320, the hook 1350 is configured to hook onto a female part 1348 of the link 1380.

Figure 34:
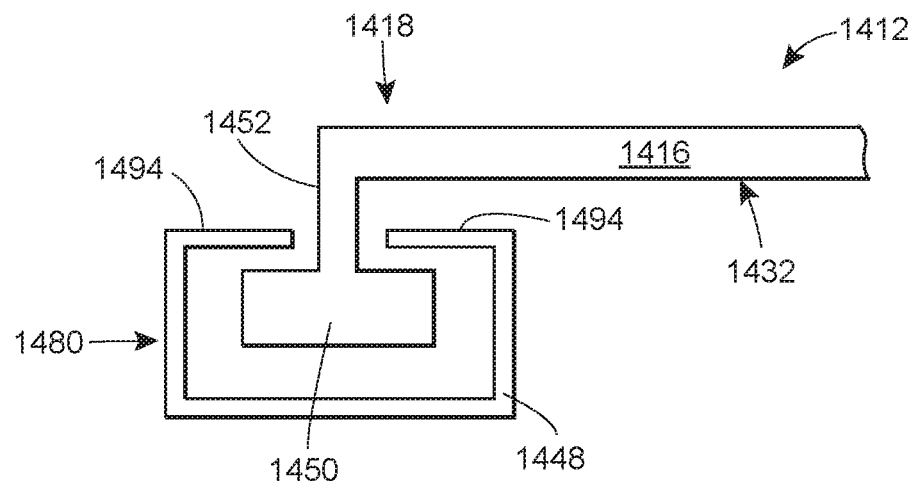
FIG. 34 is a side view of a slat of a fifteenth embodiment of a conveyor belt assembly constructed in accordance with the teachings of the disclosure.
Figure 35:
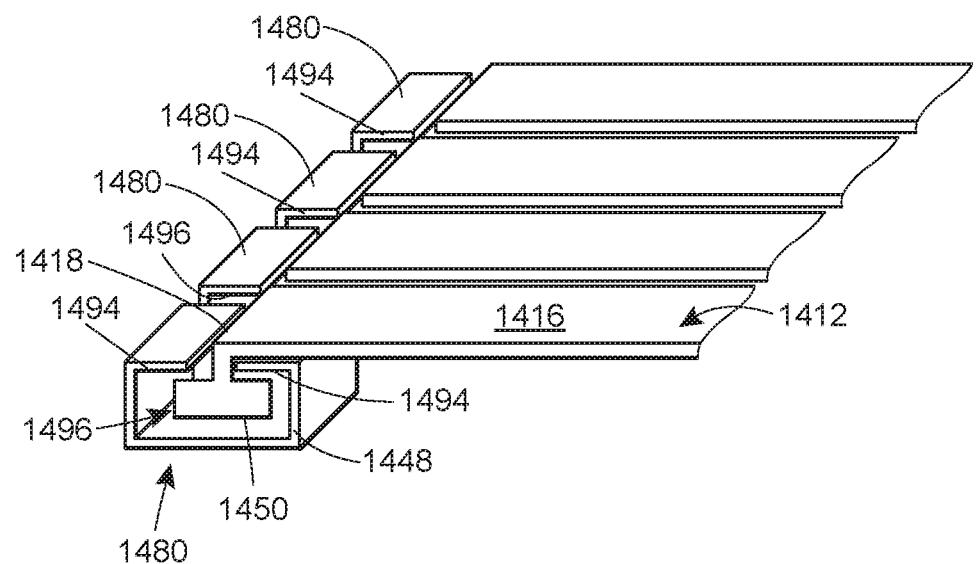
FIG. 35 is a perspective view of a plurality of slats of FIG. 34.

FIGS. 34-35 illustrate a different embodiment of a slat 1412 having a first opposing end 1418 that forms a T-shaped knob 1450 extending vertically from a bottom surface 1432 of a base 1416. The T-shaped knob 1450 is coupled to a link 1480 having a channel 1448 adapted to receive the T-shaped knob 1450 at a first opening 1496, but prevents the T-shaped knob 1450 from moving vertically by a top barrier 1494. More specifically, the first end 1418 of the slat 1412 provides an arm 1452 that is substantially surrounded by first and second top barriers 1494 of the link 1480. The first and second top barriers 1494 of the channel 1448 guide the arm 1452 of the slat 1412 and thereby prevent the knob 1450 from uncoupling from the link 1480. A perspective view of a first end 1418 of the slat 1412 is depicted in FIG. 35 where the first end 1418 of the slat 1412 is coupled to the link 1480. FIG. 35 best illustrates how the opening 1496 of the link 1480 provides a large clearance so that the T-shaped knob 1450 may slide into the channel 1448 and couple to the link 1480. The link 1480 and the knob 1450 are engaged when the slat 1412 cannot disengage the link 1480 without sliding the knob 1450 horizontally out of the channel 1448 of the link 1480. The T-shaped knob 1450 depicted in FIGS. 34 and 35 may be of another shape having a similar structure. In another embodiment, the slats 1412 may be attached to a channel-like structure 1448 similar to the channel 1448 of the links 1480 except that the channel forms a complete conveyor belt loop. A completely conveyor belt loop in the form of a channel may be formed from a one-piece channel having two ends that are welded together once the slats are coupled to the channel. Alternatively, the T-shaped knob 1450 may be able to bend or snap into the channel through the top barriers 1494 and couple to the side carrier 1414 thereafter.

Materials, Dividing Features, Etc.

The conveyor belt slats described herein can be manufactured from any suitable material, but is preferably formed from an extrudable material including, but not limited to, extrudable metals, extrudable polymers, and extrudable ceramics. Exemplary extrudable metals include, but are not limited to, aluminum, brass, copper, magnesium, and steel. Aluminum alloys such as hard coated anodized aluminum, for example AA 6063-T6, are preferred. Exemplary extrudable plastics include, but are not limited to, polyvinylchlorides, polyethylenes, polypropylenes, acetals, acrylics, nylons (polyamides), polystyrene, acrylonitrile butadiene styrenes, and polycarbonates. Additionally, the slats may be manufactured using a hybrid of materials including metals and rubbers.

The conveyor belt described and illustrated herein provides a surface of the slats that is generally smooth. The top surface may, however, be corrugated or textured to better grip an item over a distance of the conveyor belt loop. For example, the top surface of an alternative conveyor belt slat may include gripping features to retain an item while the item is transported to facilitate the frictional engagement of the food product. The gripping features allow the top surface to grip on to any kind of surface the item may have, for example, a round or very smooth item that can easily move or slide while being transported. The roughness of the surface of the slats in one embodiment may be provided by shot peening the surfaces of the slats using a predetermined shot size, as is disclosed in U.S. Application Publication No. US 2010/0275789 A1, which is herein incorporated by reference in its entirety. Alternatively, the surface of the slat may have gripping features such as an abrasive coating, dimples, furrows, or protrusions that would be strong enough to grip the food product, but not so abrasive that the gripping features rip, tear, or mark the food product. Other features that improved surface traction include, but are not limited to, perforations, bosses or dimples, etching, sanding/grinding, or other gripping features that are formed or molded. The gripping features may be integrally formed on the top surface of the conveyor belt slat and take the shape of a series of parallel rows of sharp ridges and furrows. Of course, similar features can be added post-manufacturing and/or take other geometrical shapes to enhance friction between the top surface and the item to be conveyed. Alternatively, instead of a series of rows of ridges, the gripping features may be provided by a grid of textured pegs. A variety of other geometric shapes can also be used provided that the gripping features enhance friction between the top surface and the item to be conveyed.

Figure 36A:
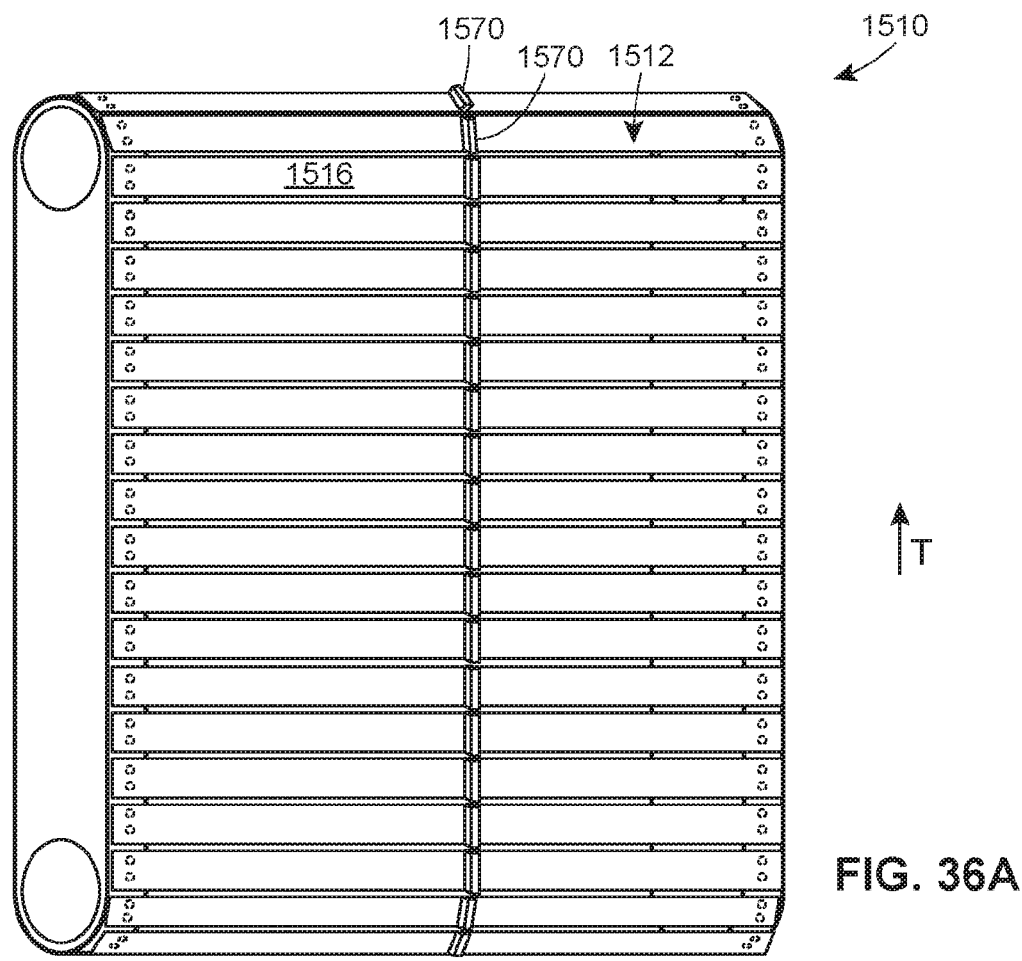
FIG. 36A is a perspective view of a sixteenth embodiment of a conveyor belt assembly constructed in accordance with the teachings of the disclosure.
Figures 36B, 37B:
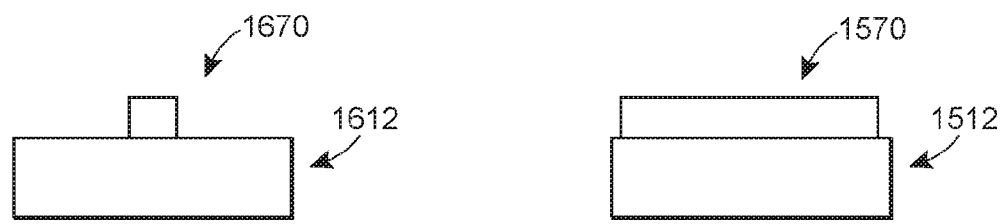
FIG. 36B is a side view of a slat of the conveyor belt assembly of FIG. 36A.
FIG. 37B is a side view of one slat of the slats of FIG. 37A.
Figure 37A:
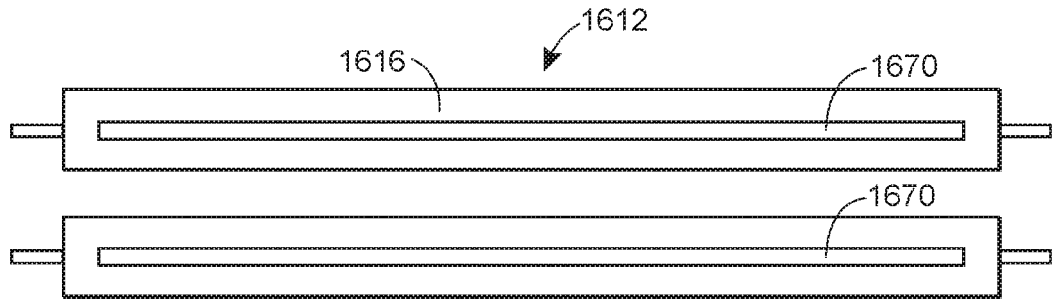
FIG. 37A is a top view of two slats of a seventeenth embodiment of a conveyor belt assembly constructed in accordance with the teachings of the disclosure.
Figure 38A:
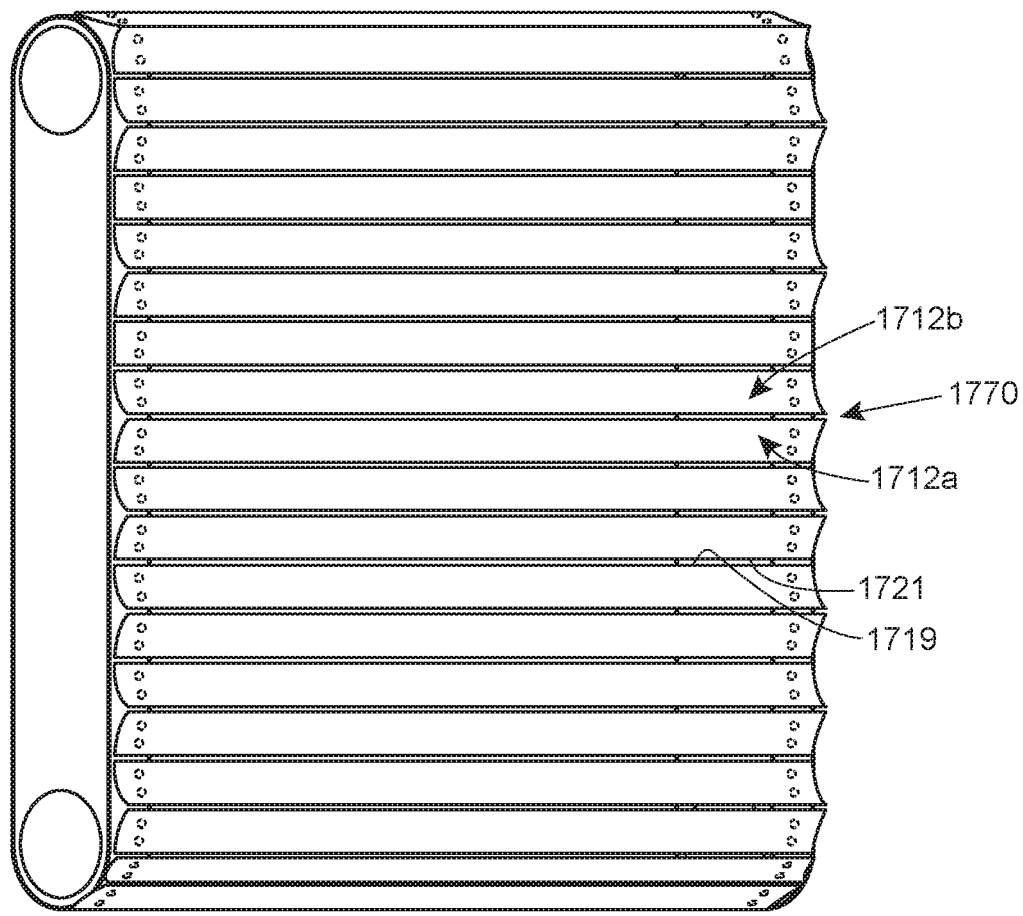
FIG. 38A is a perspective view of an eighteenth embodiment of a conveyor belt assembly constructed in accordance with the teachings of the disclosure.
Figure 38B:
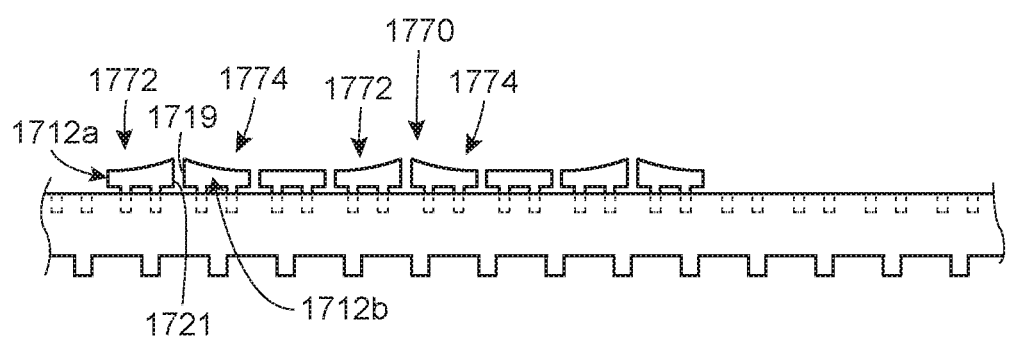
FIG. 38B is a partial side view of the conveyor belt assembly of FIG. 38A.

Turning to FIGS. 36-38, a conveyor belt 1510 may comprise a plurality of any one of the slats 1512 described herein with a divider 1570 structure which separates or divides food products on the conveyor belt 1510. A first example of a dividing structure 1570 is illustrated in the conveyor belt of FIGS. 36A and 36B. Turning first to FIG. 36A, a first slat 1512 has a barrier wall 1570 that extends vertically at a predetermined location from a base portion 1516 of the slat 1512 to divide the base portion 1516 of the slat 1512 into compartments. FIG. 36A illustrates a perspective view of the plurality of slats 1512 including a plurality of dividers 1570 that extend laterally and are that parallel relative to the conveyance travel T of the conveyor belt. In this illustrated example, every other slat 1512 has a barrier wall 1570 projecting from the base 1516 of the slat 1512. FIG. 36B illustrates a side view of the slat 1512 having the barrier wall 1570 splitting the slat 1512. The divider in FIG. 37A extends from the base 1616 of the slat 1612 longitudinally, in a direction perpendicular to the direction of conveyance travel T of the conveyor belt 1610. FIG. 37B illustrates a side view of the slat 1612 with the divider 1670 extending from the base 1616. In a different example, adjacent first and second slats 1712*a*, 1712*b* illustrated in FIGS. 38A and 38B together form a divider 1770. The first slat 1712*a* has a ramp feature 1772 extending vertically from a base 1716 of the slat 1712*a* where a highest point of the ramp feature 1770 terminates at a trailing edge 1721 of the first slat 1712*a*. The second slat 1712*b* has a ramp feature 1774 extending vertically from a base 1716 where a highest point of the ramp feature 1770 terminates at a leading edge 1719 of the second slat 1712*b*. The first and second slats 1712*a*, 1712*b* mate and thus the ramp feature 1770 of the first slat 1712*a* and the ramp feature 1770 of the second slat 1712*b* form a peak. However, this is merely illustrative, and the dividers or barrier walls may project from every other slat or every two slats, and so on. The peak 1770, or dividing structure, may serve to index food product conveyed by the conveyor belt. For example, the dividing features may prevent overloading the conveyor belt, or it may be used to index the amount of food product.

Referring back to FIG. 13, the conveyor belt assembly 611 has a sprocket 632 that drives the conveyor belt 610 of the slats 612 described herein. The sprocket 632 has a plurality of teeth 643 and a plurality of furrows 646 between the teeth 643. To drive the conveyor belt 610, the sprocket 632 engages the teeth 645 projecting from an inside surface 642 of the timing belt 614*a* and drives the conveyor belt 610 into rotational and translational motion about the conveyor belt loop 622. The sprocket 632 rotates the conveyor belt 610, for example, when the teeth 643 engage the timing belt 614*a* which carries the conveyor belt slats 612. In other examples, rollers may be used to grip the belts and rotate the conveyor belt around a conveyor belt loop.

In one embodiment, devices comprising the conveyor belt assembly according to the disclosure advantageously transport one or more food products in a direction, e.g. horizontally or vertically downward along a heated platen so as to expose the food products to the energy radiating from the platen. Any of the embodiments disclosed herein may be part of a conveyor belt assembly that can be used in many food heating devices, such as toasters, that require one or more conveyor belt assemblies. For example, the conveyor belt assembly can be implemented in a vertically oriented food heating device. A vertical food heating device employs two conveyor belt assemblies as is shown for example in U.S. Pub. No. 2010/0275789, which is incorporated herein by reference in its entirety. A horizontal food heating device is disclosed in U.S. Pat. No. 7,800,023, which is incorporated herein by reference in its entirety.

Alternatively, the conveyor belt assembly comprising one of the many embodiments of the conveyor belt slat may incorporate heat in one or more different ways. The conventional way of heating a food product in a conveyor toaster would be through heated platens, as mentioned above. The conveyor belt assembly described herein may incorporate heating mechanisms to cook or otherwise heat the food being conveyed by implementing a heated slat. In the case of a heated slat, the food being conveyed by the conveyor belt would be treated with heat emanating from the slat itself. The heated slat may emit heat by absorbing heat from exposure from a heat lamp, or the slat may be connected to a power source and use resistive heating to provide heat directly. Additionally, the conveyor belt assembly may incorporate heat through induction, for example, by winding an electromagnet such as iron wire around the top surface of the conveyor belt assembly and passing a high-frequency alternating current (AC) through the electromagnet.

What is claimed:

1. A conveyor belt, the conveyor belt comprising:
    a plurality of slats, at least one slat having a base for carrying an item, the base having a first opposing end and a second opposing end, the first opposing end and the second opposing end being substantially parallel to the direction of conveyance travel of the conveyor belt;
    at least one side carrier coupled to at least one of the first and the second opposing ends of the at least one slat by a coupling mechanism, the coupling mechanism comprising a bar that traverses through a knuckle formed in the base, the knuckle extending from a bottom surface of the base, the bar being disposed adjacent to the bottom surface of the base, and a portion of the bar being exposed at a top surface of the base.

2. The conveyor belt of claim 1, wherein both the first opposing end and the second opposing end of the at least one slat are coupled to the at least one side carrier by the coupling mechanism.

3. The conveyor belt of claim 1, wherein the knuckle is a cut-out portion of the base.

4. The conveyor belt of claim 1, wherein the bar slides through the knuckle.

5. A conveyor belt, the conveyor belt comprising:
a plurality of slats, at least one slat having a base for carrying an item, the base having a first opposing end and a second opposing end, the first opposing end and the second opposing end being substantially parallel to the direction of conveyance travel of the conveyor belt; and
at least one side carrier coupled to at least one of the first and the second opposing ends of the at least one slat by a coupling mechanism,
wherein the at least one side carrier is woven through the at least one of the first and second opposing ends, and
wherein the at least one side carrier extends through a first slat from a top surface to a bottom surface, across the bottom surface, and through the first slat from the bottom surface to the top surface.

6. The conveyor belt of claim 5, wherein the cable forms a bridge over a gap between two adjacent slats.

\* \* \* \* \*